United States Patent [19]

Anjyo

[11] Patent Number: 4,775,946
[45] Date of Patent: Oct. 4, 1988

[54] METHOD FOR CONSTRUCTING THREE-DIMENSIONAL POLYHEDRON MODEL

[75] Inventor: Kenichi Anjyo, Hitachi, Japan

[73] Assignee: Hitachi, Ltd., Tokyo, Japan

[21] Appl. No.: 845,198

[22] Filed: Mar. 28, 1986

[30] Foreign Application Priority Data

Mar. 29, 1985 [JP] Japan .................... 60-63633

[51] Int. Cl.⁴ .......................................... G06F 15/62
[52] U.S. Cl. ..................... 364/522; 364/521; 340/729
[58] Field of Search ............ 364/518–522; 340/720, 723, 727, 729, 747; 382/44–46

[56] References Cited

U.S. PATENT DOCUMENTS

| | | | |
|---|---|---|---|
| 4,549,275 | 10/1985 | Sukonick | 364/518 X |
| 4,608,653 | 8/1986 | Setoguchi | 364/522 |
| 4,685,070 | 8/1987 | Flinchbaugh | 364/518 X |
| 4,694,407 | 9/1987 | Ogdon | 364/518 |
| 4,697,178 | 9/1987 | Heckel | 364/521 X |

OTHER PUBLICATIONS

Rosenfeld et al., *Digital Picture Processing* pp. 1–8, and 333–339, 1976.
Christiansen et al., "Conversion of Complex Contour Line Definitions into Blygonal Element Mosaics" pp. 187–192, 1977.
Ganapathy et al, "A New General Triangulation Method for Planar Contours," pp. 69–75, 1982.

*Primary Examiner*—Gary V. Hackcom
*Assistant Examiner*—H. R. Herndon
*Attorney, Agent, or Firm*—Antonelli, Terry & Wands

[57] ABSTRACT

In order to achieve an interpolation display of a display object existing between two adjacent planes according to the triangulation when digital data on the two adjacent planes is given, the data items on the two planes are grouped into a plurality of connected components, respectively, and several connected components on the first plane are projected onto the connected components on the second plane. Thereafter, a sequence of points enclosing each one of the projected components are selected, and the selected point sequence is corresponded to a sequence of boundary points which enclose one of the connected components which contains the subcomponent whose projected image onto the connected components on the second plane is equal to the projected component. Then, by using every corresponding pairs of the sequences, the triangular faces are generated.

10 Claims, 23 Drawing Sheets

DIGITAL DATA INPUT

CROSS SECTION DATA U

CROSS SECTION DATA L

EXTRACTION OF BOUNDARY POINTS ON TWO ADJACENT PLANES

GENERATION OF TRIANGULAR

ITERATION OF OPERATIONS IN FIGS. 1B-1C

COMPLETED POLYHEDRON MODEL $\gamma_i$: BOUNDARY OF CROSS SECTION DATA OF LOWER PLANE
$\Gamma_j$: BOUNDARY OF CROSS SECTION DATA OF UPPER PLANE TRIANGULAR FACES ARE GENERATED ACCORDING TO THE CORRESPONDENCES BETWEEN $\gamma_1$ AND $\Gamma_1 \cup \Gamma_2$ AND BETWEEN $\gamma_2$ AND $\Gamma_3$ FIG. 6C  BRANCHING OCCURS FOR A HOLE
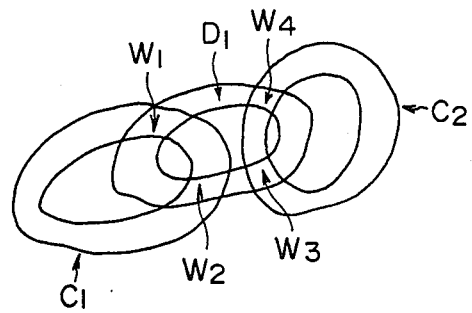
$U = D_1$, $L = C_1 \cup C_2$
$U \cap L = D_1 \cap (C_1 \cup C_2) = W_1 \cup W_2 \cup W_3 \cup W_4$
$W_i \subset D_1$, $i = 1, 2, 3, 4$
$W_1, W_2 \subset C_1$ ; $W_3, W_4 \subset C_2$
FIG. 6D
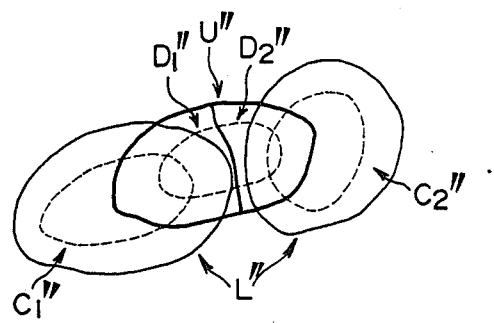

FIG. 8B-1   PARTITION TO OBTAIN CONNECTED COMPONENTS

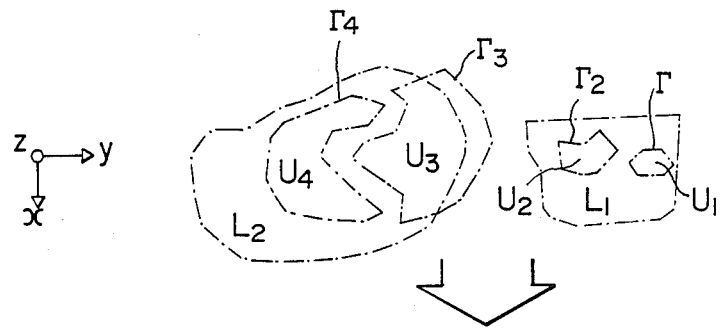

FIG. 8B-2   PARTITION THE PROJECTED COMPONENTS

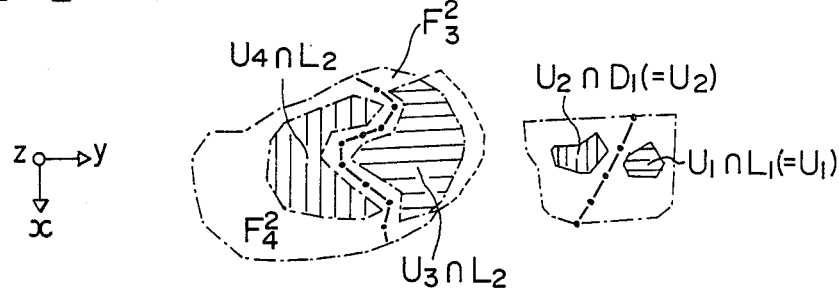

$L_2 = F_3^2 \cap F_4^2$      $L = F_1^1 \cap F_2^1$ $U_3 \cap D_2 \subset F_3^2$   $U_1 \cap L_1 \subset F_1^1$ $U_4 \cap D_2 \subset F_4^2$   $U_2 \cap L_2 \subset F_2^1$ $F_3^2 \cap F_4^2 = \phi$      $F_1^1 \cap F_2^1 = \phi$ FIG. 8B-3   CORRESPOND THE UPPER LOOP TO THE LOWER LOOP (PREPROCESSING OF TRIANGULATION)

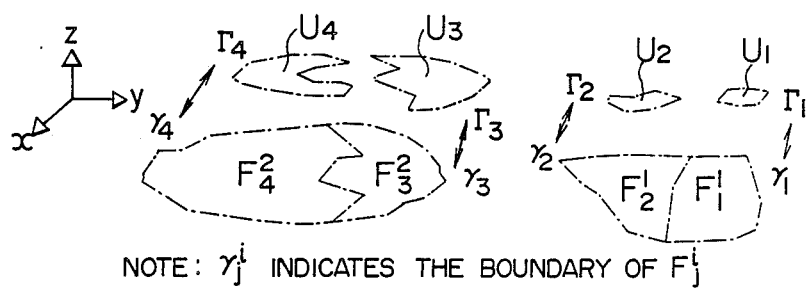

NOTE: $\gamma_j^i$ INDICATES THE BOUNDARY OF $F_j^i$

EIGHT TILES NEAREST TO TILE '1' OF U₁

IF NO NUMBER IS PRESENT, A NUMBER '1' IS ASSIGNED $F_j = E_j \quad j = 1, 2, 3$

FIG. 9A-4 GROWING OPERATION

ADDED TILES ASSIGNED WITH A NUMBER '1'

$F_1 \supseteq U_1$, $F_2 = U_2$, $F_3 = U_3$ $P_1 \cong U_1$ , $F_2 \cong U_2$ , $F_3 = U_3$ $F_i \rightleftharpoons U_i$ , $i = 1 \cdot 2 \cdot 3$ $U \rightleftharpoons \bigcup_{i=1}^{3} F_i$ $$L \not\supseteq \bigcup_{i=1}^{3} F_i$$

$$L = \bigcup_{i=1}^{3} F_i$$

FIG. IIA-2
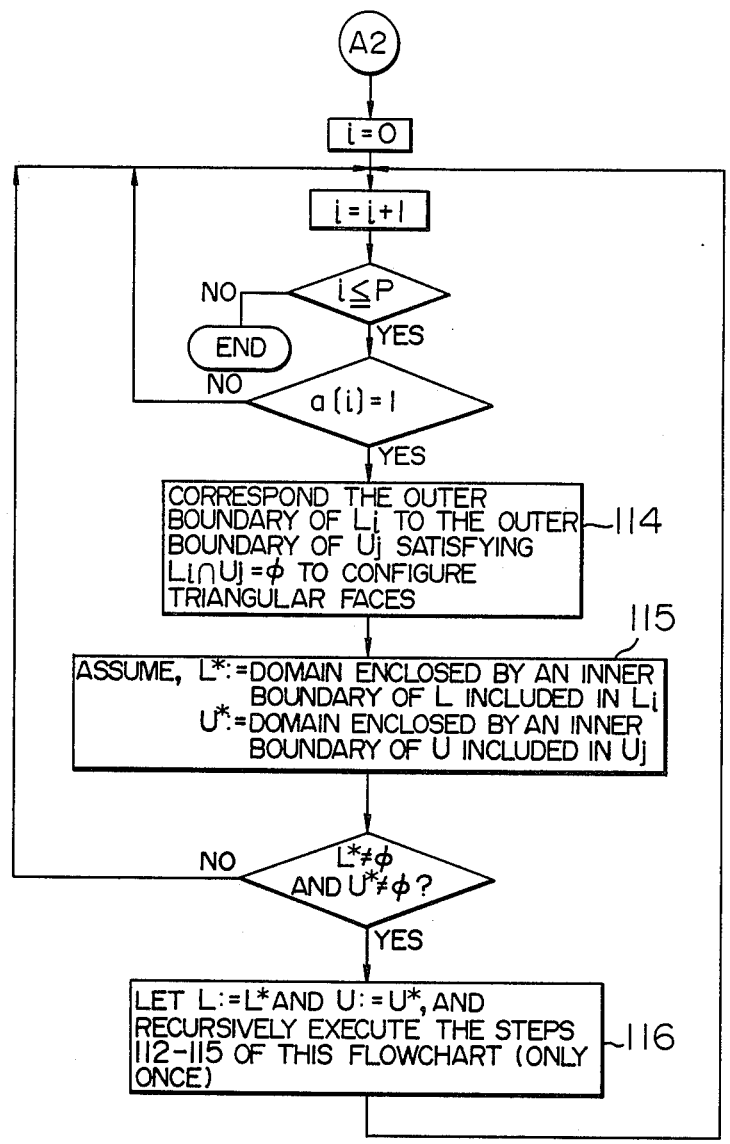

FIG. IIA-3

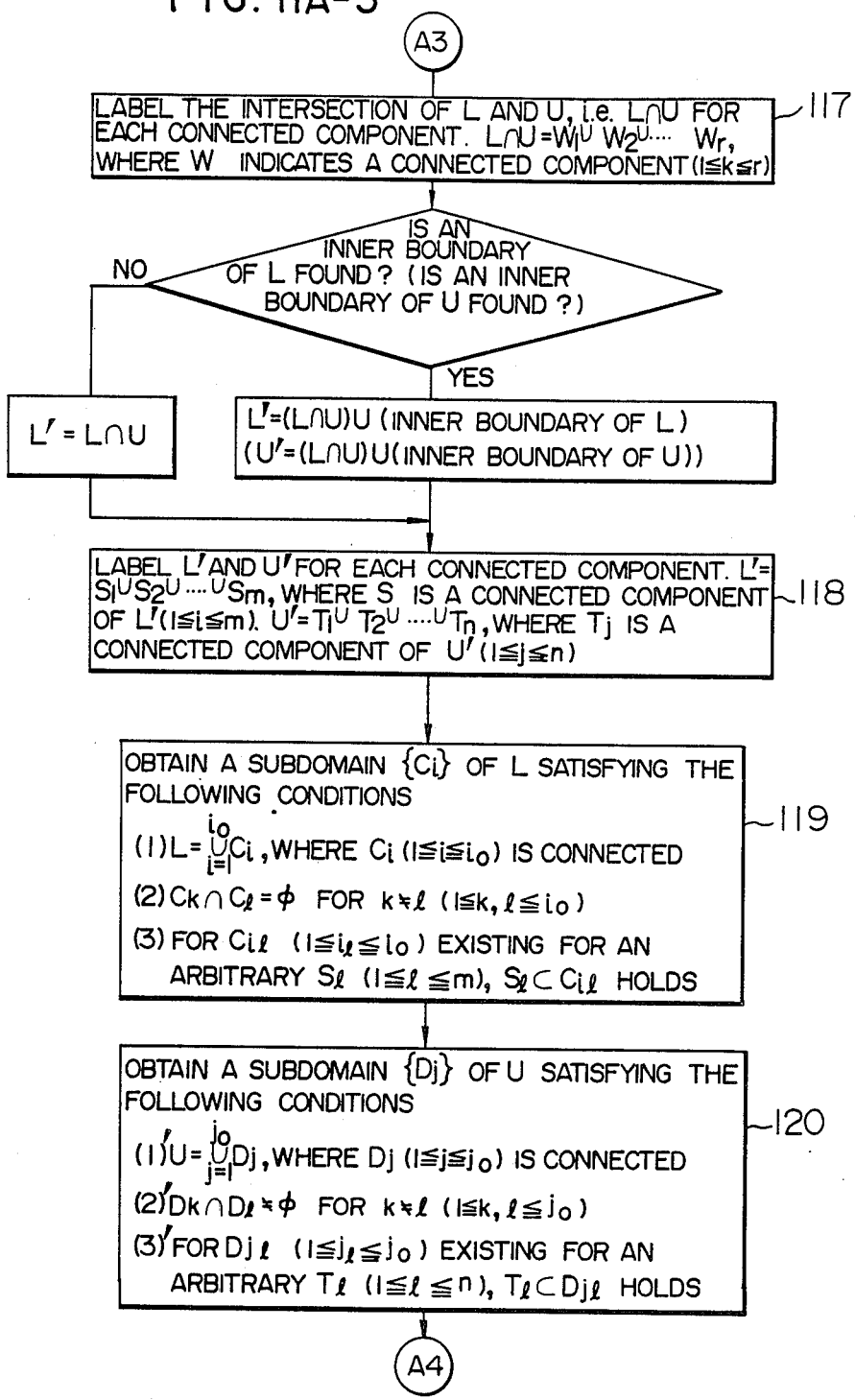

(A3)

117 — LABEL THE INTERSECTION OF L AND U, i.e. $L \cap U$ FOR EACH CONNECTED COMPONENT. $L \cap U = W_1 \cup W_2 \cup \ldots W_r$, WHERE W INDICATES A CONNECTED COMPONENT ($1 \leq k \leq r$)

IS AN INNER BOUNDARY OF L FOUND? (IS AN INNER BOUNDARY OF U FOUND?)

NO → $L' = L \cap U$

YES → $L' = (L \cap U) \cup$ (INNER BOUNDARY OF L)
($U' = (L \cap U) \cup$ (INNER BOUNDARY OF U))

118 — LABEL L' AND U' FOR EACH CONNECTED COMPONENT. $L' = S_1 \cup S_2 \cup \ldots \cup S_m$, WHERE S IS A CONNECTED COMPONENT OF L' ($1 \leq i \leq m$). $U' = T_1 \cup T_2 \cup \ldots \cup T_n$, WHERE $T_j$ IS A CONNECTED COMPONENT OF U' ($1 \leq j \leq n$)

119 — OBTAIN A SUBDOMAIN $\{C_i\}$ OF L SATISFYING THE FOLLOWING CONDITIONS (1) $L = \bigcup_{i=1}^{i_0} C_i$, WHERE $C_i$ ($1 \leq i \leq i_0$) IS CONNECTED (2) $C_k \cap C_\ell = \phi$ FOR $k \neq \ell$ ($1 \leq k, \ell \leq i_0$)

(3) FOR $C_{i\ell}$ ($1 \leq i_\ell \leq i_0$) EXISTING FOR AN ARBITRARY $S_\ell$ ($1 \leq \ell \leq m$), $S_\ell \subset C_{i\ell}$ HOLDS

120 — OBTAIN A SUBDOMAIN $\{D_j\}$ OF U SATISFYING THE FOLLOWING CONDITIONS (1)' $U = \bigcup_{j=1}^{j_0} D_j$, WHERE $D_j$ ($1 \leq j \leq j_0$) IS CONNECTED (2)' $D_k \cap D_\ell = \phi$ FOR $k \neq \ell$ ($1 \leq k, \ell \leq j_0$)

(3)' FOR $D_{j\ell}$ ($1 \leq j_\ell \leq j_0$) EXISTING FOR AN ARBITRARY $T_\ell$ ($1 \leq \ell \leq n$), $T_\ell \subset D_{j\ell}$ HOLDS (A4)

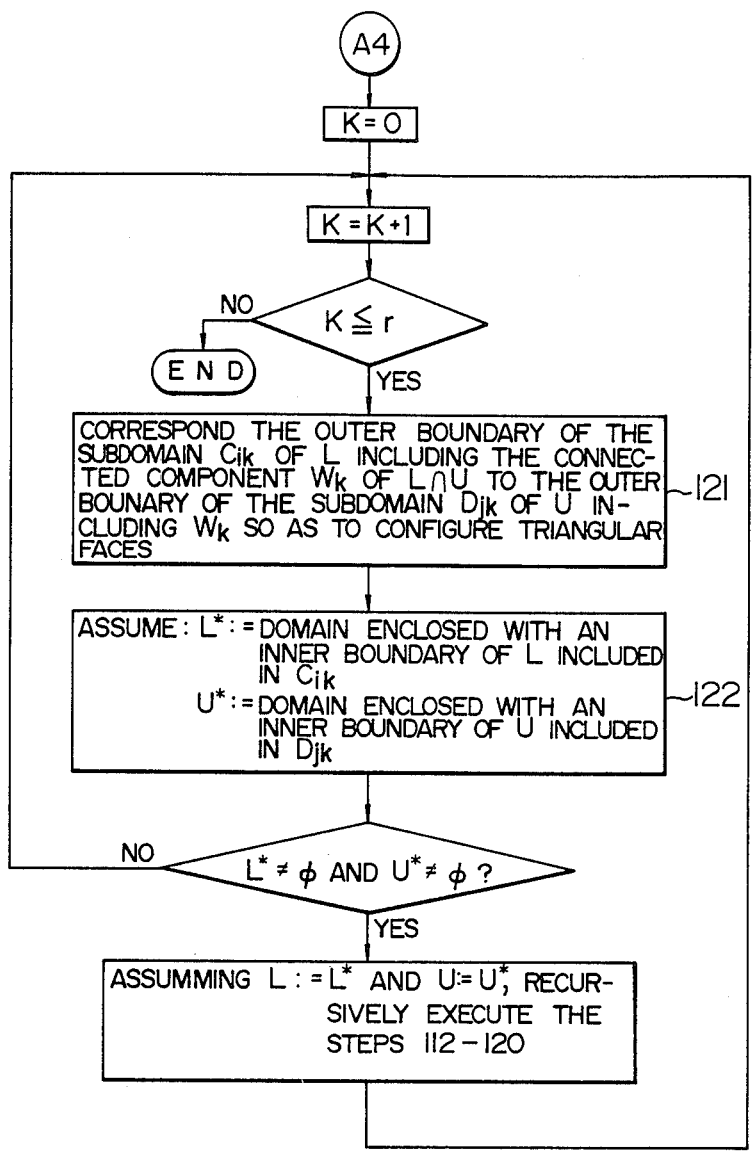
FIG. IIA-4

FIG. IIB-1
BRANCHING DOES NOT OCCUR FOR THE HOLE

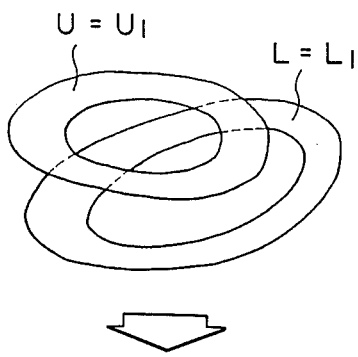

FIG. IIB-2
$a(1)=1, b(1)=1$
: THE CONNECTED COMPONENTS HAVE THE ONE-TO-ONE CORRESPONDENSE

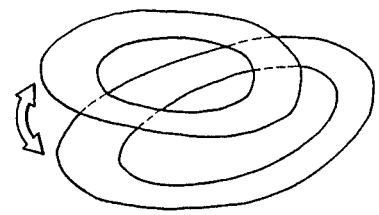

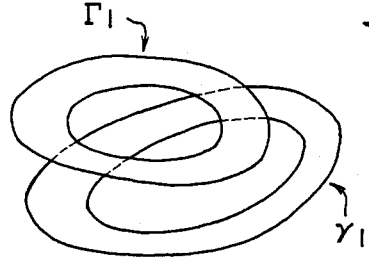

FIG. IIB-3
$\Gamma_1$ = OUTER BOUNDARY OF $U_1$
$\gamma_1$ = OUTER BOUNDARY OF $L_1$

FIG. IIB-4
$\Gamma_2$ = INNER BOUNDARY OF $U_1$
$\gamma_2$ = INNER BOUNDARY OF $L_1$
$L^*$ = HOLE ENCLOSED BY $\gamma_2$
$U^*$ = HOLE ENCLOSED BY $\Gamma_2$

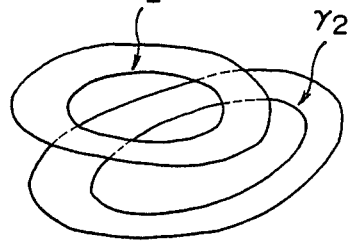

FIG. IIB-5

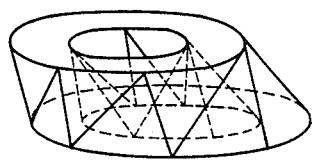

TRIANGULATION IS EFFECTED FOR EACH PAIR $(\gamma_k, \Gamma_k)$, WHERE $k = 1, 2$ FIG. IIC-I   BRANCHING OCCURS FOR HOLES
① LABEL THE CONNECTED COMPONENTS OF L AND U
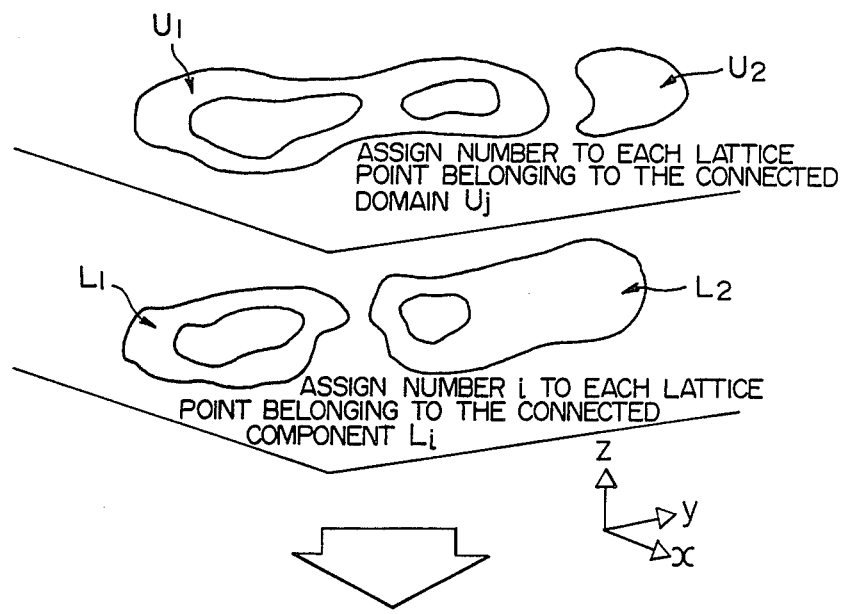
FIG. IIC-2
② LABEL THE CONNECTED COMPONENTS OF $L \cap U : W_1 \cup W_2 \cup W_3 \cup W_4$
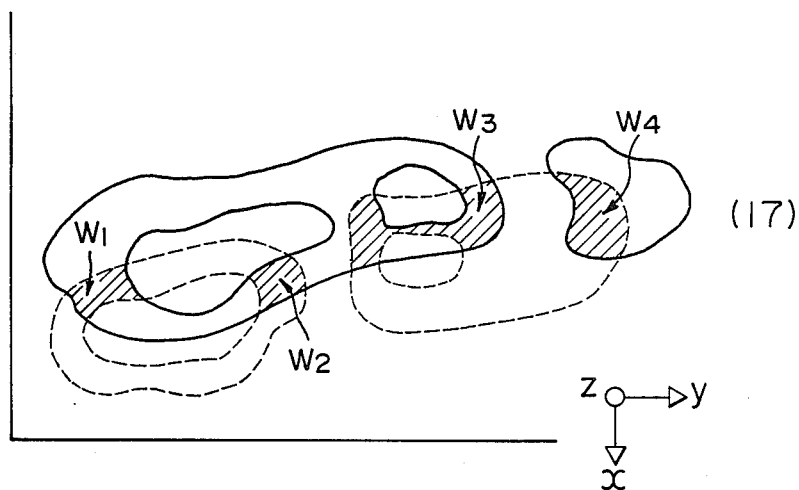
(17)

FIG. 11C-3 ③ LABEL THE CONNECTED COMPONENTS OF
$L' = (L \cap U) \cup$ (INNER BOUNDARY POINTS OF L) AND $U' = (L \cap U) \cup$ (INNER BOUNDARY POINTS OF U):
$L' = S_1 \cup S_2 \cup S_3$, WHERE $S_k$ INCLUDES INNER BOUNDARY $\gamma_k^i$ (k=1,2)
$U' = T_1 \cup T_2 \cup T_3$, WHERE $T_k$ INCLUDES INNER BOUNDARY $\Gamma_k^i$ (k=1,2)

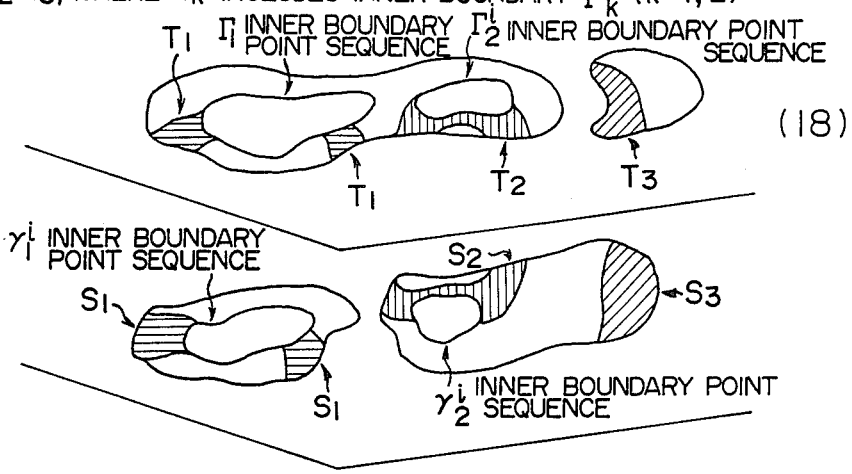

(18)

FIG. 11C-4
④,⑤ COMPONENT PARTITION OF L AND U

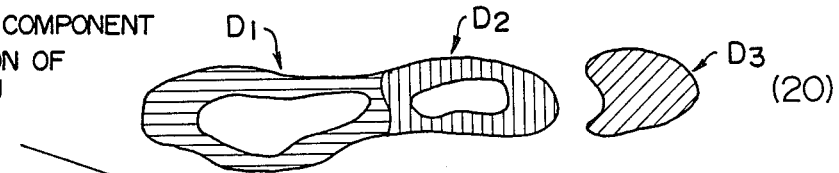

(20)

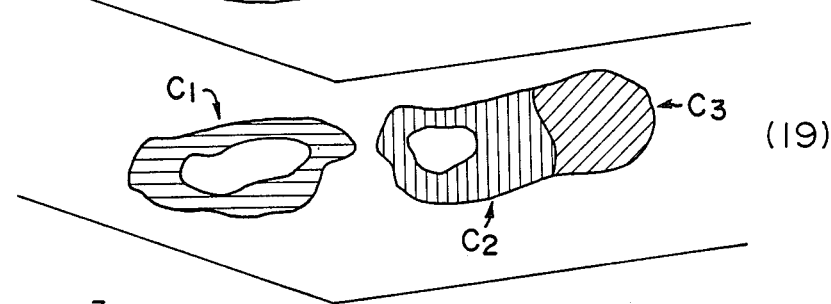

(19)

WHERE $L = \bigcup_{i=1}^{3} C_i$; $C_k \cap C_\ell = \phi$ (k≠ℓ); $S_i \subset C_i$, i=1,2,3

$U = \bigcup_{j=1}^{3} D_j$; $D_k \cap D_\ell = \phi$ (k≠ℓ); $T_j \subset D_j$, j=1,2,3

FIG. IIC-5
⑥ CORRESPOND OUTER BOUNDARIES: TRIANGULATION IS ACHIEVED FOR EACH PAIR $(\gamma_k, \Gamma_k)$, $k=1,2,3$; WHERE
$\gamma_i$ = OUTER BOUNDARY OF $C_i$ AND
$\Gamma_j$ = OUTER BOUNDARY OF $D_j$
$W_1, W_2 \subset C_1, D_1$ ; $W_k \subset C_k, D_k$ $k=3,4$
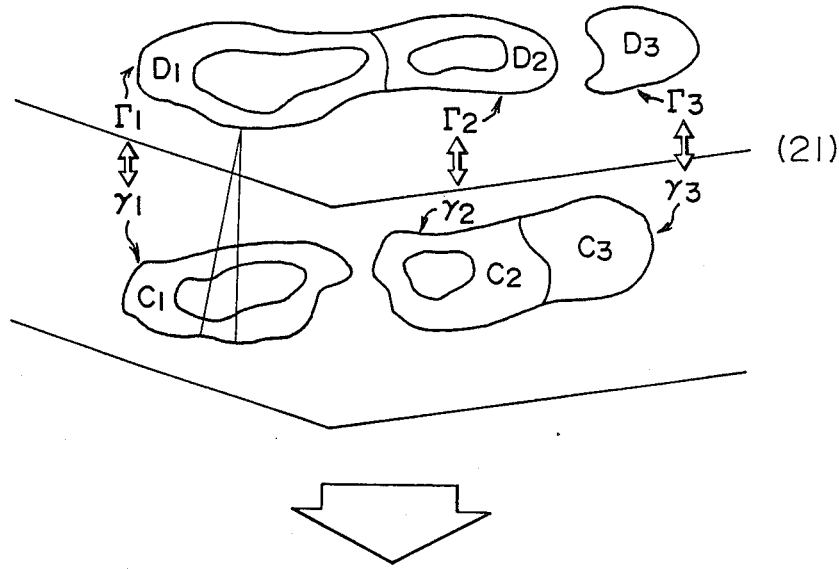
(21)
FIG. IIC-6
⑦ CORRESPOND INNER BOUNDARIES: TRIANGULATION IS ACCOMPLISHED FOR EACH PAIR $(\gamma_k, \Gamma_k)$, $k=4,5$
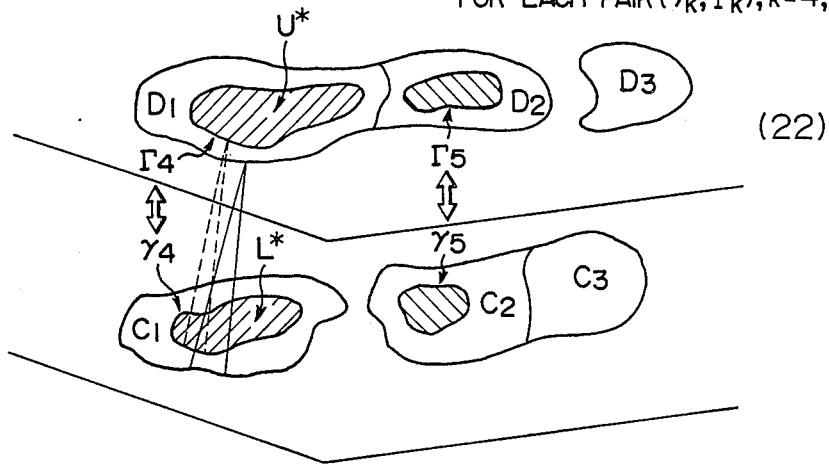
(22)

$U = U_1 \cup U_2$ $L \cap U = W_1 \cup W_2$

~(121)

$L = C_1 \cup C_2$
$C_1 \supset W_1$
$C_2 \supset W_2$

~(122)

$(D_1 = U_1, D_2 = U_2)$

~(123)

$\gamma_i$ := BOUNDARY POINT SEQUENCE OF $C_i$
$\Gamma_j$ := BOUNDARY POINT SEQUENCE OF $D_j$

METHOD FOR CONSTRUCTING THREE-DIMENSIONAL POLYHEDRON MODEL

BACKGROUND OF THE INVENTION

The present invention relates to a technique for constructing a polyhedron model of surfaces of a three-dimensional object from a plurality of sets of digitized data, each set associated with a cross section of the three-dimensional object, and for displaying the surface contour model obtained from the polyhedron model on a graphic display unit; and in particular, to a method for displaying a three-dimentional object which is suitably applicable to fields related to three-dimensional image processing such as the computer aided design (CAD) and computer graphics.

The technique for displaying a surface contour model of an existing three-dimensional object on a graphic display unit are applicable to various practical fields including the medical image processing in which a CT scanner, etc. are used. The display can be considered to mainly comprise three stages, namely:

(i) Technique for constructing the three-dimensional digital image data of an existing object, (ii) Technique for configuring a polyhedron model of surface contour of the object based on the three-dimensional digital image data, and (iii) Technique for displaying a clear, comprehensive contour model with smooth surfaces by applying the color interpolation, brightness interpolation, and the like to the polyhedron model resulted from the technique of (ii) above.

These techniques (i) to (iii) can be considered to be associated with an input method, a contour model configuration, and a display method, respectively.

The present invention is primarily related to the technique stage (ii) described above. The following paragraphs describe an operation in which a three-dimensional image data is decomposed into data of points on a plurality of parallel planes, and triangular faces or elements are configured by connecting points on boundaries of images lying on two adjacent planes, which is repeatedly performed for all pairs of adjacent parallel planes, thereby representing the entire shape of the object with the resultant triangular faces or patches. First of all, the method for configuring the contour model will be reviewed in detail. For the format of the three-dimensional digital data of (i), a case in which a series of data N(1), N(2), ..., N(n) representing data of cross sections of a three-dimensional object, the cross sections corresponding to a plurality of parallel planes passing through the object are given, will be first described herebelow. Each N(i) denotes a two-dimensional image data associated with a cross section on an i-th plane of the object. In the field of present three-dimensional image processing, the obtainable input data is represented in this format in most cases. The procedure of (ii) is ordinarily as follows (FIGS. 1A–1E). In FIG. 1A, a series of crosssection data $\{N(i)\}i=1, 2, ..., n$ are first inputted. Next, as shown in FIG. 1B, boundary points are extracted from cross-section data N(i) and N(i+1) on two adjacent planes. In FIG. 1C, based on the series of the boundary points, a polyhedron model is formed with triangular faces which represent or approximate the contour of surfaces of the object between the two adjacent planes. In FIG. 1D, the operations of FIGS. 1(B)–1(C) are repeatedly achieved for all values of i(i=1, ..., n−1) to construct a polyhedron model of the entire object as shown in FIG. 1E.

Among these processing, the operations related to FIGS. 1B–1C to be executed for the data N(i) and N(i+1) of the two adjacent cross sections are collectively referred to as a fundamental operation herebelow. Automation procedures of this fundamental operation and reduction of human load therefrom have long been desired to be solved.

In the conventional technology, as described in literatures such as "Conversion of Complex Contour Line Definition into Polygonal Element Mosaics", ACM SIGGRAPH'78 Proceedings (1978) by Christiansen and Sederberg and "A New General Triangulation Method for Planar Contours", ACM SIGGRAPH'82 Proceedings (1982) by Ganapathy and Demehy, the processing speed of the fundamental processing has been increased under a restriction that the cross-section data A(i) is enclosed by only one closed broken line (loop) comprising boundary points (for example, as shown in FIGS. 1A–1E). However, the cross-section data N(i) is actually enclosed with a plurality of loops constituted from the boundary points. For example, the N(i) of FIG. 2 are enclosed with two loops $\gamma_1$ and $\gamma_2$, while the N(i+1) are enclosed with three loops $\Gamma_1$, $\Gamma_2$, and $\Gamma_3$. To configure the triangular faces in the fundamental operation of FIG. 1C, a loop constituted from the points of N(i) must be related to a loop comprising the points of N(i+1) according to the one-to-one correspondence. Consequently, when the N(i) and N(i+1) each have a loop constituted from a plurality of boundary points, there arises a problem, namely, how to establish the one-to-one correspondence. In the case of FIG. 2, it will be natural to correspond $\gamma_1$ and $\gamma_2$ to $\Gamma_1$, $\Gamma_2$ and $\Gamma_3$, respectively. However, even if there exists the correspondence between $\gamma_1$ and $\Gamma_1$ and $\Gamma_2$ in this situation, that is, only a one-to-two correspondence is assigned therebetween, so the triangulation cannot be conducted yet (FIG. 3). In other words, a problem to determine pairs between the loops associated with N(i) and those associated with N(i+1) need be solved to create the triangular faces. In this regard, a relatively simple case such as a case associated with the correspondence between $\gamma_1$ and $\Gamma_1$ and $\Gamma_2$ of FIG. 3 has already been solved by the prior art technique. The method described in the report by Christiansen is as follows. For simplicity, the description will be made on the assumption that there exists the one-to-two correspondence between the pairs of associated loops.

From the points of loops $\Gamma_1$ and $\Gamma_2$ as shown in a frame 41 of FIG. 4A, two points $t_5$ and $s_4$ having the smallest distance therebetween are selected and an intermediate point m is assigned on a line between the points $t_5$ and $s_4$ with the height of the point m with respect to the z coordinate axis set to half the height of $t_5$ and $s_4$ (as shown in a frame 42). Thereafter the related nodes are renumbered so as to form a loop (as shown in a frame 43).

Finally, the procedure used when the one-to-one coresponence exists between the loops to be connected to each other is applied to this case, thereby producing the triangular faces (Frame 43).

This procedure, however, as already noted in the Christiansen's report by the author, leads to a meaningless triangulation if it is applied to a case in which the loops on the same plane are quite near to each other and have complex shapes as shown in FIG. 4B(44), where two loops $\Gamma_1$ and $\Gamma_2$ form the boundary of the cross section on the upper plane and a loop Γ is the boundary on the lower plane. A solution proposed by Christiansen is as follows. As depicted in a frame 45 of FIG. 4B, points A and E of Γ$_1$ are connected to B and D of Γ$_2$, respectively. That is, two loops constituted from the data on the upper plane are substituted by a loop Γ* including the points A–F, which is corresponded to the loop γ on the lower plane (as shown in a frame 45), thereby generating the triangular faces. This procedure necessitates operator's instruction to be supplied to the computer system.

According to the prior art technology for constructing a polyhedron model as described above, the conversational processing with the computer plays an important role. Consequently, it is desired to develop an efficient method for automatically generating a polyhedron model by use of a computer, thereby minimizing the human load.

The following terms are essential for the description herebelow.

L: Cross section data (denoted as N(i) hereabove) on the lower plane of two adjacent planes.
U: Cross section data (denoted as N(i+1) hereabove) on the upper plane of two adjacent planes.

A plurality of loops are configured by connecting the boundaries of L and U, where each loop is referred to as a boundary loop herebelow. Among the boundary loops, a loop enclosing an objective domain or component is referred to as an outer boundary, whereas a loop encircling a hole in the objective component is referred to as an inner boundary. Since a component generally has several outer and inner boundaries, each subcomponent enclosed with an outer boundary is referred to as a connected component or simply as a component. For example, if the subcomponents indicated with small solid circles in FIG. 5 constitute an objective component, there exist two connected components, in other words, the number of outer boundaries is two. The connected component in the left-half portion of FIG. 5 includes two inner boundaries. When an outer boundary of a component comprises only one boundary loop, the component is regarded as connected. If a connected component does not include an inner boundary, the connected component is regarded as simply connected.

The method for determining the presence/absence of a hole has already been described in the following literatures, and hence the description thereof will be omitted: Azriel Rosenfeld and Avinash C. Kak; "Digital Picture Processing", Academic Press, Chapters 1 and 9, 1976, "SPIDER User's Manual", Electrotechnical Laboratory Headquarters (image processing package) and "On Topological Property of Sampled Binary Graphics", The Transactions of Institute of Electronics and Communication Engineers of Japan, Section (D), Vol. 56-D, No. 11, pp 662–669 (1973) by Yokoi, Torii, and Fukumura.

According to the fundamental operation, the surface contour of a 3D object between two adjacent planes is represented by a polyhedron model comprising triangular faces. Assume the polyhedron model to be P. It is desired to develop an algorithm for automatically creating the polyhedron P only by inputting the cross section data L and U, thereby significantly reducing the human load required for configuring the polyhedron P.

As already described above, if the cross section data L and U are connected, and specifically, simply connected, the construction of the polyhedron P can be automatically and easily accomplished by use of the prior art procedures. In the general cases, however, as shown in FIGS. 2–3, the boundary loops on the upper plane cannot be related to the boundary loops on the lower plane according to the one-to-one correspondence (in general, the number of the boundary loops varies between the upper and lower planes as depicted in FIGS. 2–3). In addition, if the contours of cross sections are complicated, for example, the contours of the connected components associated with the cross section data on the same plane are considerably near to each other (FIG. 4B) or the cross section data includes holes (FIG. 5), then the conventional method necessarily requires a conversational processing with the computer.

Conditions under which the one-to-one correspondence cannot be established between the boundary loops on the adjacent upper and lower planes will be described. For simplicity, the connected components of the cross section data L and U are assumed to be simply connected. In FIG. 6A, cross sections of a doughnut are indicated by shaded portions. Assuming the cross section data of the first and second planes to be L and U, respectively, this diagram indicates that the number of the connected components is changed from one ($=A_1=L$) to two ($=B_1$ and $B_2$, $B_1 \cup B_2 = U$), namely, branching takes place. Next, assuming the cross section data of the second and third planes to be L and U, respectively, it is understood that the connected components $B_1$ and $B_2$ of L are combined with the connected component $C_1(=U)$, namely, confluence occurs. If such a branching or confluence appears among the connected components, the one-to-one correspondence cannot be established between the boundary loops on the adjacent upper and lower planes. Moreover, as shown in FIG. 6B, a branching and a confluence may occur among the connected components at the same time, which further complicates the problem to be solved. As described above, when the components of L and U are simply connected, only the outer boundary of each component need be considered; however, if the L and U include holes, the correspondence of inner boundaries must be also taken into consideration.

In any cases, the essential problem is as follows, namely, when the one-to-one correspondence cannot be established between the boundary loops on the two adjacent planes, how the polyhedron P should be configured in the most rational manner? According to the prior art technique as described in connection with the Christiansen's method (FIG. 4A), the automatic processing can be achieved by use of a computer system only when the object has a very simple shape.

SUMMARY OF THE INVENTION

It is therefore an object of the present invention to provide a high-performance three-dimensional digital image display method in which the drawbacks of the prior art technique are overcome to minimize the load disposed on the user when creating the triangular faces as elements for displaying the image.

Another object of the present invention is to provide a three-dimensional digitized model configuration method which enables a triangular patch creation or triangulation without necessitating instructions to be supplied by an operator to the computer system even when an object has a complicated surface contour which cannot be suitably processed by the prior art procedures.

In order to achieve an interpolation display of a display object existing between two adjacent planes according to the triangulation when digital data on the two adjacent planes is given, the data items on the two planes are grouped into a plurality of connected domains, respectively, and several connected domains on the first plane are projected onto the connected domains on the second plane. Thereafter, a sequence of points enclosing each one of the projected domains are selected, and the selected point sequence is corresponded to a sequence of boundary points which enclose one of the connected domains which contains the subdomain whose projected image onto the connected domains on the second plane is equal to the projected domain. Then, by using every corresponding pairs of the sequences, the triangular faces are generated. The sequence of this procedure can include(s) the following steps.

(a) For the two adjacent planes, each cross section's data is grouped into several disjoint connected components, and each component is labeled.

(b) The connected components on a plane are projected onto the other plane, and the overlapped components (intersections) between the projected connected components and the connected components on said other plane are labeled.

(c) Extended components having following properties (i) and (ii) are selected;
   (i) each extended component is connected and disjoint to each other. And the union of the extended component is equal to the cross section's image on said other plane.
   (ii) Every labeled overlapped components on said other plane is contained in one of the extended components.

(d) In the step (b), the connected components on said other plane are projected onto said plane so as to label every component of the overlapped components (intersection) between the projected connected components and the connected components on said other plane.

(e) Extended components having following properties (i)' and (ii)' are selected;
   (i)' Each extended component is connected and disjoint to each other and the union of the extended component is equal to the cross section's image on said plane.
   (ii)' Every labeled overlapped components on said plane is contained in one of the extended components.

(f) Triangulation is conducted by assuming as verteces a sequence of the outer-boundary points of the extended components on the two planes including the overlapped components for which the same label is contained in the extended component on said plane and the extended component on said other plane.

(g) The triangulation or triangle patching is sequentially achieved for said plurality of planes to approximate the surface contour of the 3D object, thereby displaying the approximated shape on a display unit.

If the objective 3D object may possibly include holes, the following steps are effected.

The presence/absence of a hole is checked for each overlapped component determined from the data on each adjacent plane.

The overlapped components obtained from the data on said plane are projected onto said other adjacent plane.

For the overlapped components determined to have a hole based on the data on said plane, the overlapped components connected by a sequence of inner boundary points are projected as a overlapped component onto said other plane so as to obtain the overlapped components (intersections) between the projected components and the overlapped components on said other plane, and then the overlapped components are labeled.

The overlapped components obtained from the data on said other plane are projected onto said adjacent plane.

For the overlapped components determined to have a hole based on the data on said other plane, the overlapped components connected by a sequence of inner boundary points are projected as a overlapped component onto said plane so as to obtain the intersections between the projected components and the overlapped components on said plane, and then the intersections are labeled.

The triangle patching is achieved by assuming as the verteces a sequence of the outer-boundary points of the extended components including the overlapped components for which the same label is contained in the extended component on said plane and the extended component on said other component, and if extended components include the sequence of inner boundary points, the triangle patching or triangulation is effected between the inner boundary points.

BRIEF DESCRIPTION OF THE DRAWINGS

The present invention will be apparent from the following detailed description taken in conjunction with the accompanying drawings in which:

FIGS. 6A-6D are diagrams illustrating problems and exception processing associated with branching and confluence of connected components of adjacent cross section data;

FIG. 8A and FIG. 8B-1 to FIG. 8B-3 are a flowchart and related diagrams illustrating an embodiment of the present invention in which image data on two adjacent planes are processed so as to obtain a triangulated image of an object associated with the two adjacent planes;

FIG. 9A-1 to FIG. 9A-2, FIG. 9B-1 to FIG. 9B-2, and FIG. 9C-1 to FIG. 9C-2 are diagrams illustrating an application example of component partition algorithm.

FIG. 11A-1 to FIG. 11A-4 are flowcharts demonstrating a fundamental operation according to the present invention in which cross section data on two adjacent planes are processed to obtain a polyhedron model of an object between the two planes;

FIG. 11B-1 to FIG. 11B-5 and FIG. 11C-1 to FIG. 11C-6 are schematic diagrams illustrating a fundamental operation of the present invention in which cross section data on two adjacent planes are processed to create a polyhedron model of an object between the two planes.

DESCRIPTION OF THE PREFERRED EMBODIMENTS

Referring to the accompanying drawings, embodiments of the present invention will be described in detail.

Figure 1A:
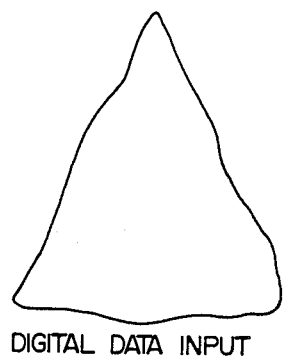
FIGS. 1A-1E are configuration diagrams of a polyhedron model of an entire contour of an object.
Figure 1B:
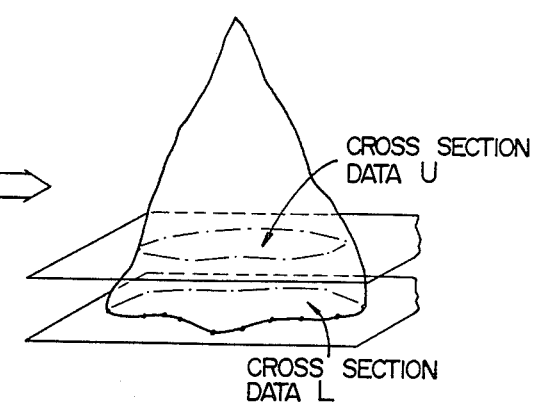
Figure 1C:
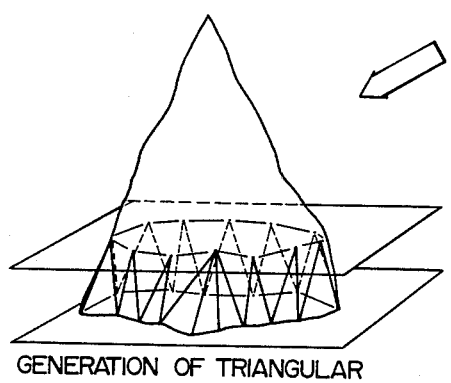
Figure 1D:
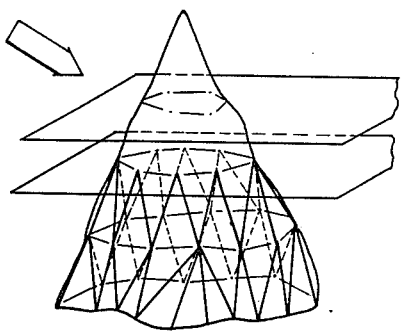
Figure 1E:
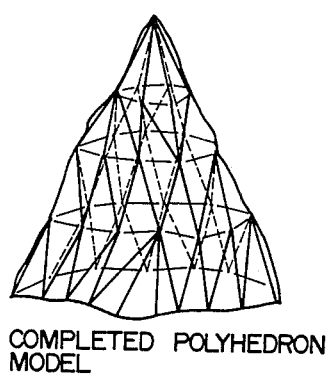
Figure 7:
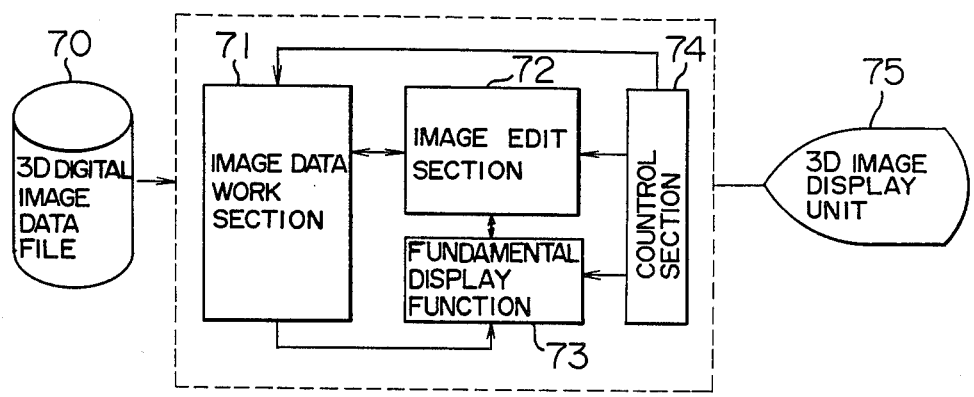
FIG. 7 is a schematic block diagram illustrating an example of a 3D image display system to which the present invention is applicable.

FIG. 7 is a schematic circuit block diagram illustrating an example of a system to which the triangulation of the present invention is applicable. Data stored in a file 70 is represented, for example, in a 3D array in which the value thereof is determined to be 1 or $\phi$ according to an array $[n_x, n_y, n_z]$. Assuming the value corresponding to $[n_x, n_y, n_z]$ to be expressed as $f(n_x, n_y, n_z)$, the points for which $f(n_x, n_y, n_z)=1$ holds represent a display object, whereas the points for which $f(n_x', n_y', n_z')=0$ is satisfied represent the background on the display unit. Among the display objective data on two adjacent planes in a display space in this case, data for which $f(n_x, n_y, n_z)=1$ and $n_z=i$ hold corresponds to image data $N(i)$ on one of the two planes and data for which $f(n'_x, n'_y, n'_z)=1$ and $n_z=i+1$ are satisfied corresponds to image data $N(i+1)$ on the other plane of the two adjacent plane. Each time a pair of data $(N(i), N(i+1))$ is transmitted to an image data work section 71, the fundamental operation as described in connection with FIGS. 1B–1C is accomplished for the triangulation. A fundamental display function section performs operations such as displacement, deletion, and concealment of a face and smooth shading, whereas an image edit section 72 achieves under control of a control section 74 correction and modification on images to be outputted to a 3D image display unit 75. Although the final results may be supplied to the display unit 75, the original triangle patches obtained by the triangulation are usually required to be subjected to the smoothing and shading operations or to the correction and modification with respect to the details thereof by use of the display unit 75 under control of the control section 74, namely, the patches are not displayed in the received original format in ordinary cases.

Figure 2:
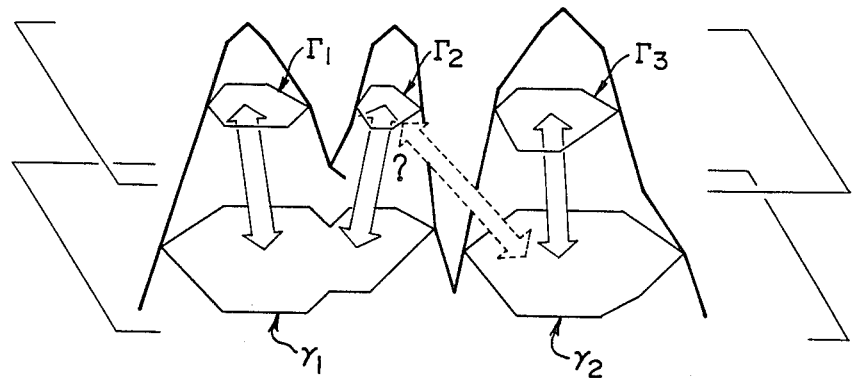
FIGS. 2-3 are diagrams demonstrating problems of the fundamental operation.
Figure 3:
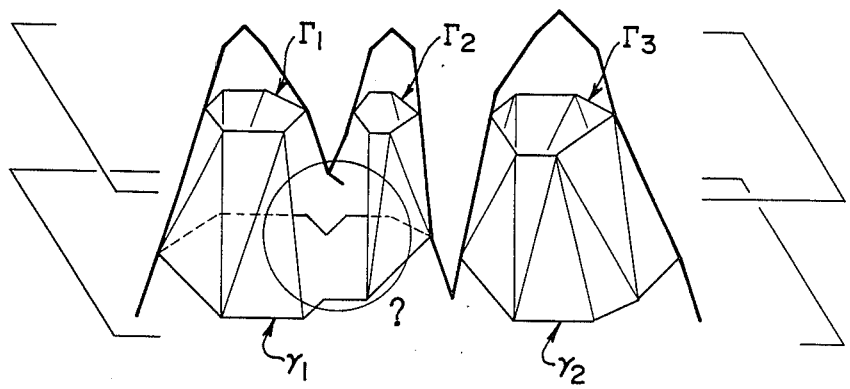
Figure 8A:
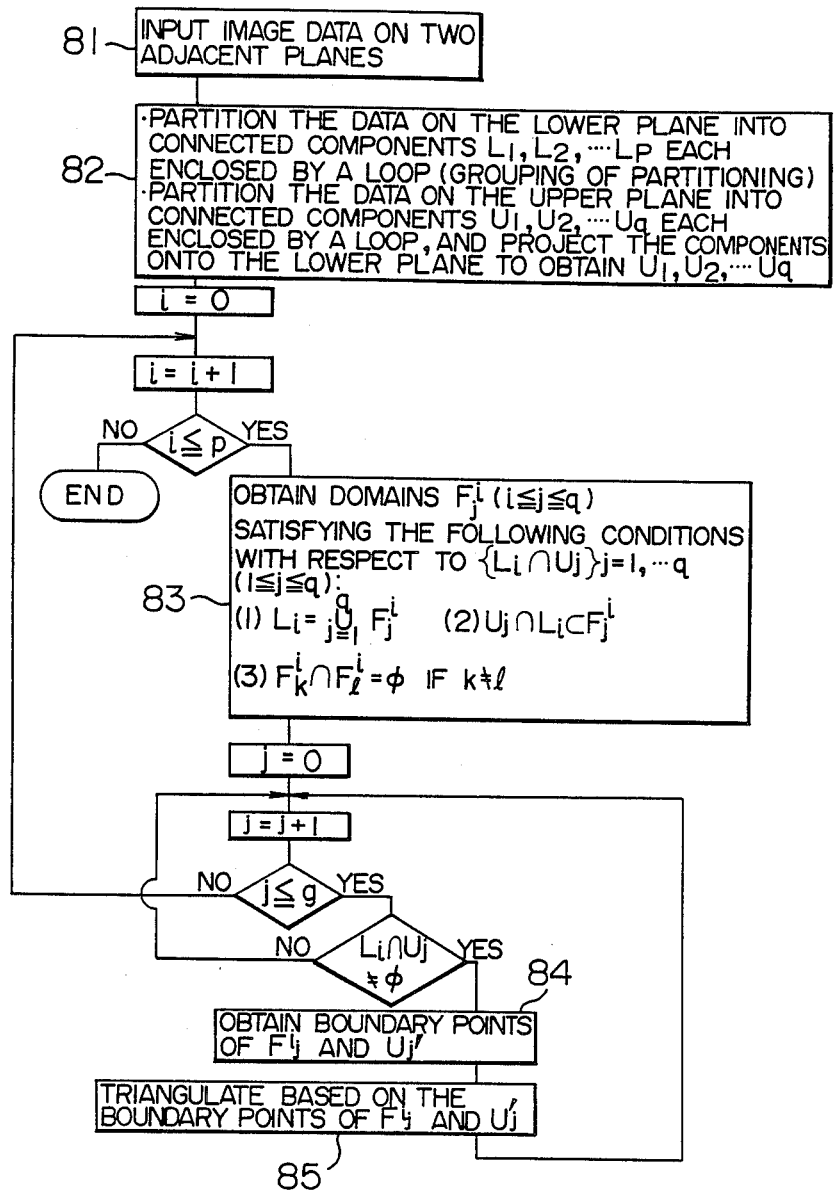
Figures 1, 9A:
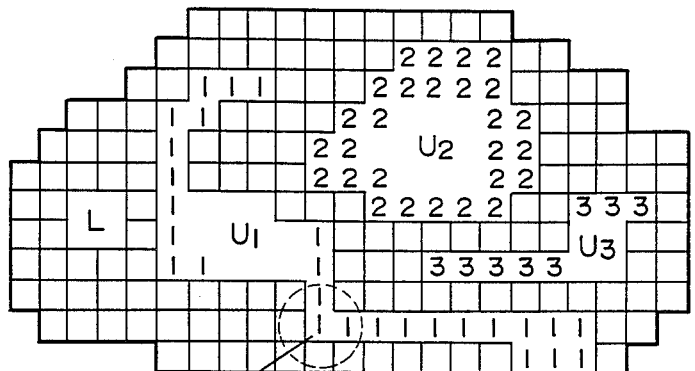
Figures 2, 9A:
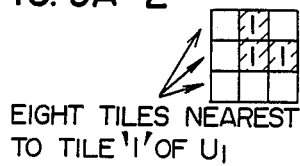
Figures 3, 9A:
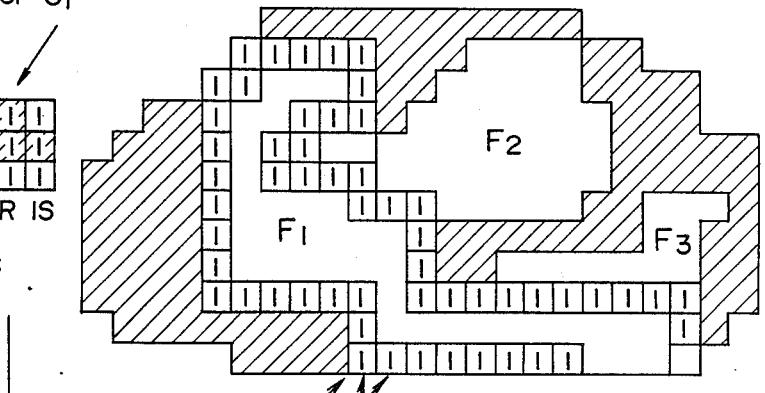

FIG. 8A is a flowchart illustrating a processing procedure according to the present invention in which image data on two adjacent planes are processed to generate triangle faces of an object between these two planes, while FIG. 8B-1 to FIG. 8B-3 are schematic diagrams associated with the processing of FIG. 8A. When the fundamental operation depicted in these figures is achieved for all two adjacent planes of an object, the entire object to be displayed is triangulated. The following conditions are assumed for simplicity in the description herebelow, namely, a group of planes are parallel to an x-y plane (FIGS. 2–3) and the fundamental operation is sequentially conducted from the lowermost two adjacent planes upward to the upper-most two ajacent planes (FIG. 8A).

The fundamental operation is started with an operation to read the display image data on two adjacent planes (81). Next, the data items on the respective planes are partitioned into connected components each encircled with a loop (82, FIG. 8B-1). Assume the connected components on the lower and upper planes to be denoted as $L_1, L_2, \ldots, L_p$ and $U_1', U_2', \ldots U_q'$, respectively. The components $U_1', U_2', \ldots, U_q'$ are projected onto the lower plane to obtain components $U_1, U_2, \ldots$. First, components $F_1^i, \ldots, F_q^i (1 \le j \le q)$ satisfying the following conditions are obtained with respect to the $L_i$ ($1 \le l \le p$) and components $U_1 \cap L_i \ldots, U_q \cap L_i$.

(1) $L_i = \bigcup_{j=1}^{q} F_j^i$ (2) $U_j \cap L_i \subset F_j^i$ (3) $F_k^i \cap F_j^i = \phi$ for $k=1$ ($1 \le k, 1 \le q$), where $\phi$ indicates an empty set. And $F_j^i = \phi$ for $j$ if $U_j \cap L_i = \phi$ (83, FIG. 8B-2). An example of a concrete component partition algorithm for determining the $F_j^i$ satisfying these conditions (1)–(3) will be described in relation to FIGS. 9A-1, 9A-4, 9B-1, 9B-2, 9C-3, and 9C-4.

Then, the boundary points are obtained with respect to $U_j$ and $F_j^i$ for $F_j^i \neq \phi$ (84, FIG. 8B-3) and the boundary point sequence of $F_j^i$ are corresponded to that of $U_j$, thereby applying the method proposed by Christiansen et al. or Ganapathy et al. to accomplish the triangulation (85). Ordinarily, the boundary point sequences of $U_j$ and $F_j^i$ each comprise a loop of nodes, and hence the one-to-one correspondence is considered to be established therebetween. According to the procedures described above, the procedures of triangulation after the image data input operation can be automatically performed even if there were the branching or confluence in the connected components between two adjacent cross sections.

The following paragraphs describe an example of a component partition algorithm used in a step 83 of FIG. 8A. According to this algorithm, components of 2D lattice points $U_1, U_2, \ldots, U_r$ (r in number) and a component L of 2D lattice points including all of the components $U_1, \ldots, U_r$ are inputted so as to obtain as outputs components of 2D lattice points $F_1, \ldots, F_r$ (r in number) satisfying the following conditions.

(1)' $L = \bigcup_{j=1}^{r} F_j$ (2)' $U_j \subset F_j (1 \le j \le r)$ (3)' $F_k \cap F_i = \phi$ ($1 \le k = 1 \le r$)

Referring now to FIGS. 9A-1 to 9C-4, a description will be made of this algorithm. Assume that the overall 2D lattice component comprises square tiles, that the tiles assigned with a number; represent a component $U_j$ ($1 \le j \le r$), and that a component U includes the tiles encircled by a bold broken line (FIG. 9A-1). For simplicity, $r=3$ is assumed in FIG. 9A-1.

Figure 4A:
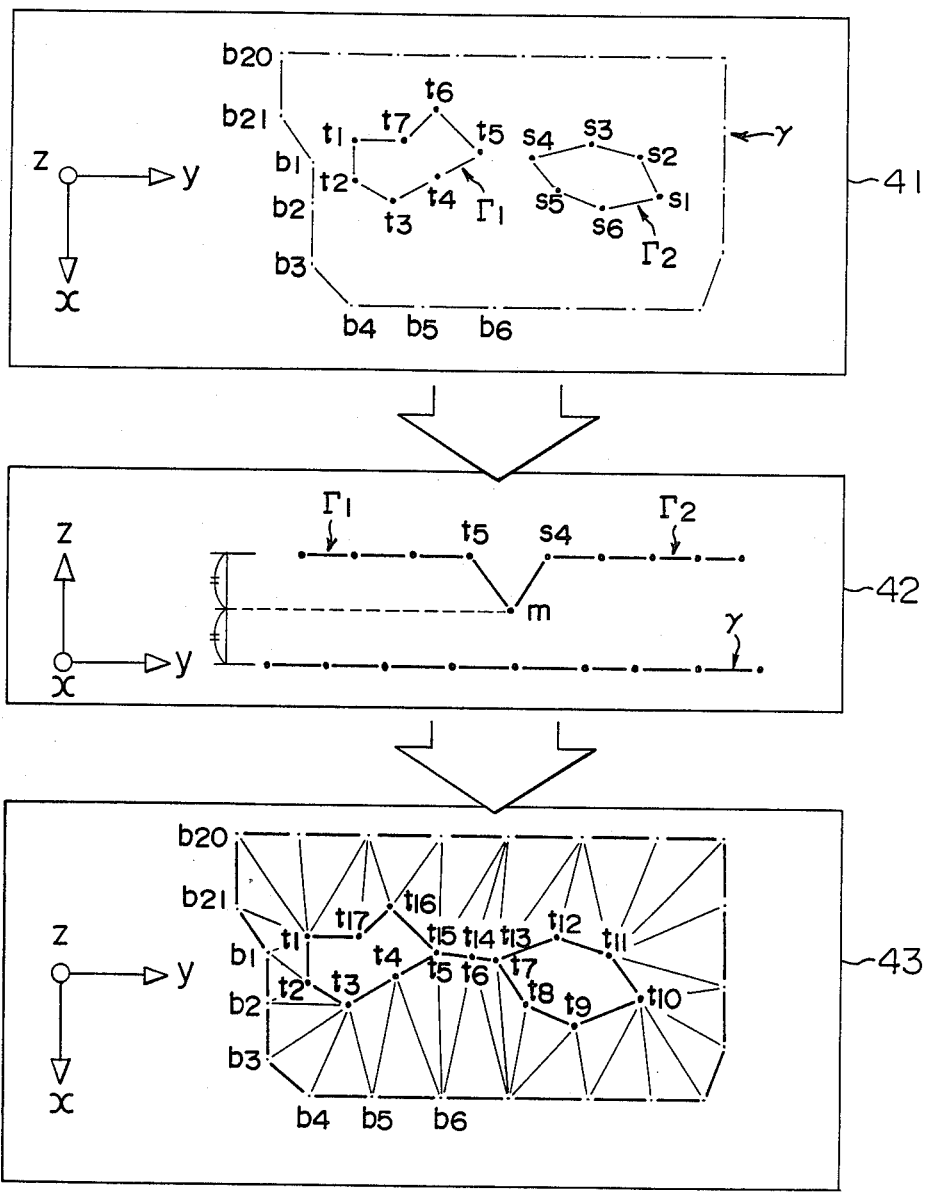
FIGS. 4A-4B are explanatory diagrams of the prior art technique.
Figure 4B:
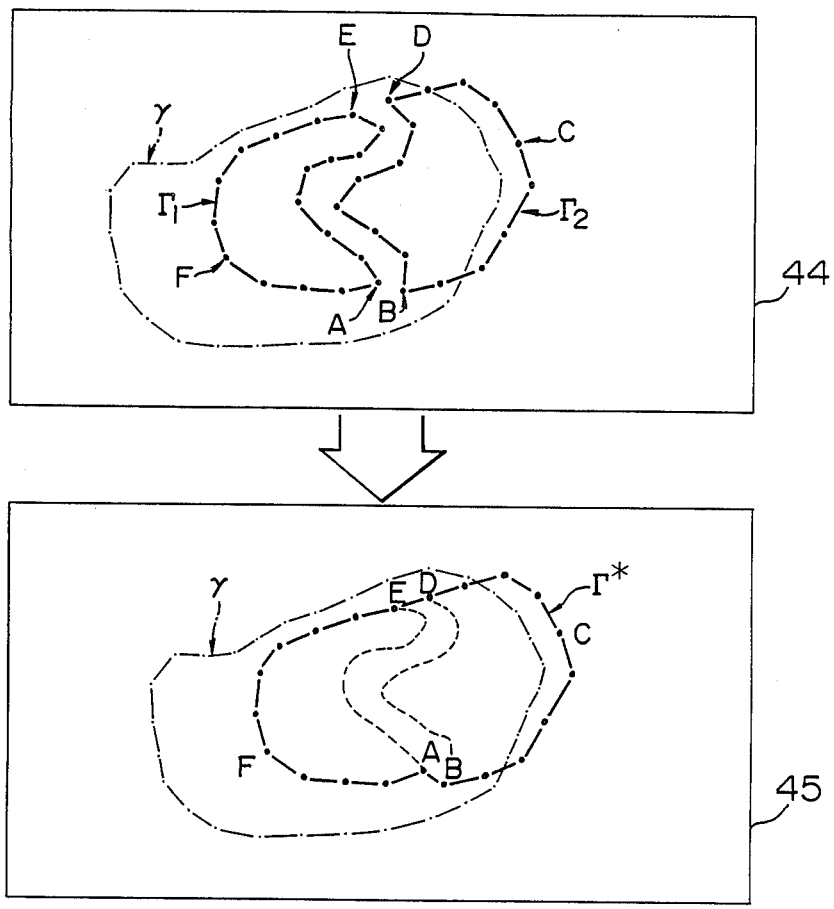
Figures 1, 9B:
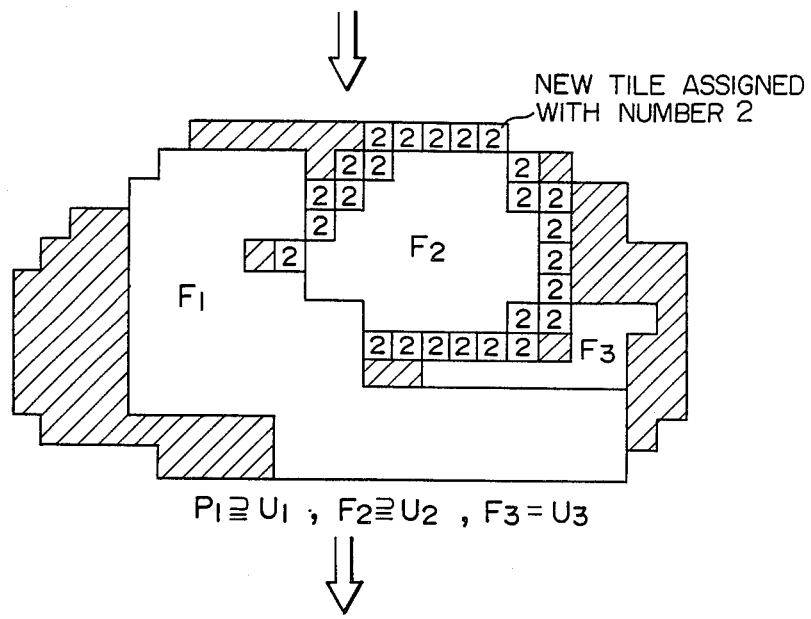
Figures 2, 9B:
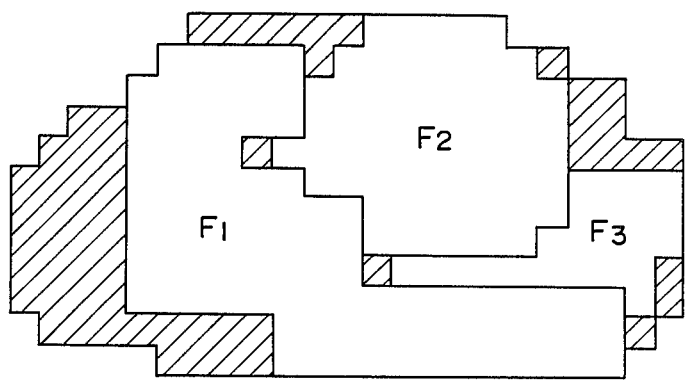
Figures 1, 9C:
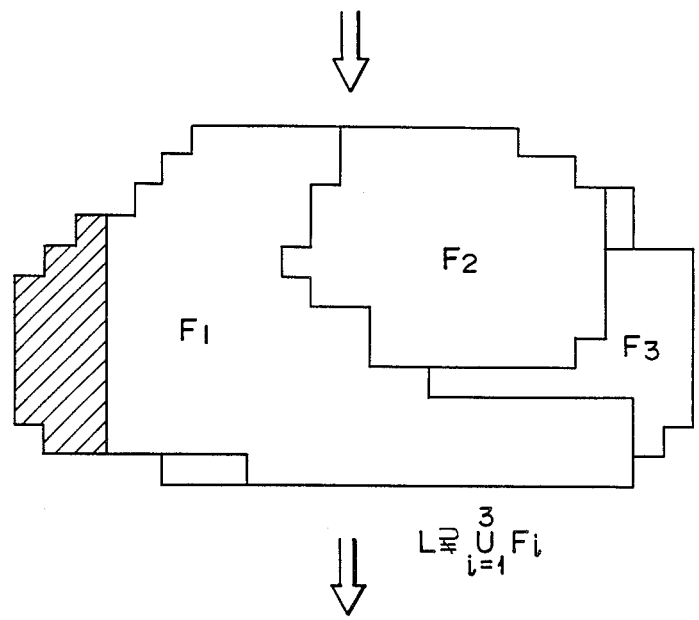
Figures 2, 9C:
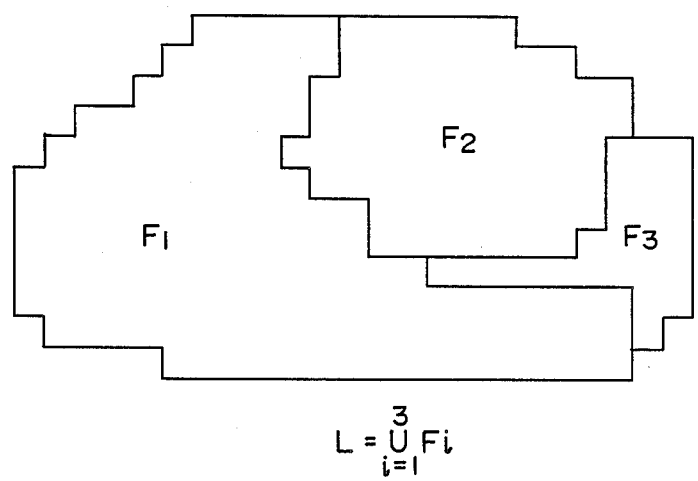

First, assume the number of components or tiles constituting the components $U_1$-$U_r$ to be expressed as $I_{CNT}$ and the number of components in the component U to be represented as $I_{END}$. Clearly, $I_{CNT} \le I_{END}$ holds. If $I_{CNT} = I_{END}$, the conditions (1)'–(3)' are satisfied as $F_j = U_j (1 \le j \le r)$, so $F_j = U_j$ is outputted and the operation is thus completed. If $I_{CNT} < I_{END}$, the operation is sequentially executed for $j=1, 2, \ldots r$ as follows. The boundary points of $F_j$ is determined, and for each boundary point or each tile in FIG. 9A-2, the points among eight points (or four horizontal and vertical points at the right-left and above-below can be used) nearest to the boundary point (eight tiles in FIG. 9A-2, this also applies to the following description) which are included in the component L as indicated by a dotted circle are checked to determine whether or not to belong to another $F_k$ ($k \ne j$). That is, if the point is a tile numbered with k, no action is taken; if the point has no number, a number j is assigned (FIG. 9A-3) and the value of $I_{CNT}$ is incremented by one. After this operation, namely, growing operation is executed for all boundary points of $F_j$, a new $F_j$ is defined as a total of the points each numbered with a number j (FIG. 9A-4). Next, the operation described above is repeated for the boundary points of $F_{j+1}$ (FIG. 9B-1). So long as $I_{CNT} < I_{END}$ holds, this operation is repeatedly effected for all values of j (FIG. 9B-2). If $I_{CNT} < I_{END}$ remains unchanged even when the operation is achieved for all values of j, this operation is again repeated beginning from j=1 (FIG. 9C-1). Repeating these operations, $I_{CNT} = I_{END}$ appears during a growing operation with respect to a boundary point of an $F_p$. At this point, the growing operation is stopped, a new $F_p$ is defined as a total of the points each assigned with a number P, and $F_1, \ldots, F_r$ are obtained as a result (FIG. 9C-2).

In the step 83 of FIG. 8A, if the component partition algorithm is applied to this case, the i-th component $L_i$ is first selected, r is set as the total number of values for j which satisfies $U_j \cap L_i \neq \phi$ in FIG. 8A, and for the numbers set as $j_1, j_2, \ldots, j_r$ for which $U_j \cap L_i = \phi$, assume $U_1 = U_{j_1'} \cap L_i, U_2 = U_{j_2'} \cap L_i, \ldots, U_r = U_{j_r'} \cap L_i$, then $F_1, \ldots, F_r$ satisfying the conditions (1)′–(3)′ are obtained. Consequently $F_j^i$ of the step 83 is expressed as $$F_j^i = \begin{cases} F_p \text{ for } j = j_p \ (1 \leq p \leq r) \\ \phi \text{ for other } j \end{cases}$$

According to this embodiment, the problems of correspondence between components on the two adjacent planes and that between the boundary points as described in the Article (ii) of the Background of the Invention can be solved almost without necessitating the instructions to be supplied from the user to the computer, which significantly minimizes the human load required for the triangulation job in the prior art system. Also in the cases such as of the case of FIG. 4B where the triangulation cannot be smoothly achieved even if the human intervention is applied, a natural triangulation having a high fidelity with respect to given image data can be easily accomplished without increasing the human load.

Figure 10A:
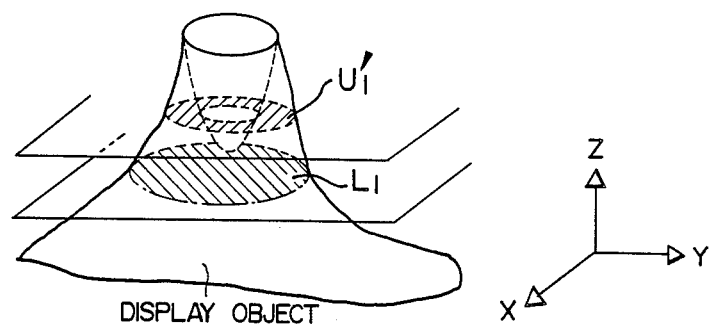
FIG. 10A to FIG. 10C are schematic diagrams depicting an embodiment of the present invention handling an object including a hole.
Figure 10B:
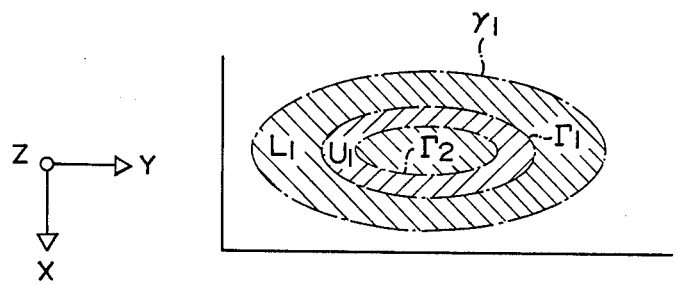
Figure 10C:
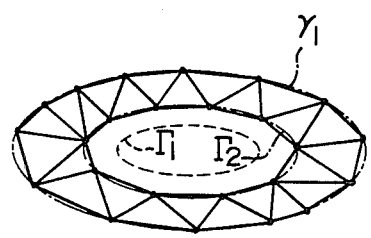

Next, let us consider a more general case in which holes are included in the display object (FIG. 10A). In this case, the $L_i$ and $U_j$ of the embodiment shown in FIG. 8A may be respectively enclosed with a plurality of loops (step 82). For example, the boundary of $U_1$ in FIG. 10B comprises two loops $\Gamma_1$-$\Gamma_2$. To overcome this difficulty, the processing of step 84 of FIG. 8A is modified as follows. The boundary points of $F_j^i$ and $U_j$ are obtained. Among the loops on each plane which have the boundary points as the nodes thereof, those loops located at the outer-most positions are corresponded to each other. For example, the loops $\gamma_1$ and $\Gamma_1$ are corresponded in FIG. 10B. This operation enables the triangulation to be executed without paying attention to the holes existing in the display object (FIG. 10C). The processing is satisfactorily effective when an outline of the surface of a display object is to be displayed, namely, the shape of an object can be attained by use of a simplified processing which was not available in the prior art technique.

According to another embodiment of considering hole-boundary points described below, the digital data L and U on two adjacent planes are inputted, and a pair of loops $(\gamma_i, \Gamma_i)$, i=1, 2, ..., m satisfying the following conditions is generated by a computer based on the inputted data, thereby accomplishing the fundamental operation without the conventional processing with the computer.

Condition 1 $\gamma_i \subset L$; $\Gamma_i \subset U$ $(1 \leq i \leq m)$

Condition 2 Let $\Delta_i$ be a polyhedron resulted by connecting the nodes of $\gamma_i$ and $\Gamma_i$, then a union $$\bigcup_{i=1}^{m} \Delta_i$$

is a polygonal model of the surface of an object between the two adjacent planes.

When the fundamental operation is thus automated, the polyhedron model of the entire shape of the object is automatically configured as a result.

Referring now to the application example of FIGS. 11A-1 to 11C-6, the configuration procedures of the pairs of loops $(\gamma_i, \Gamma_i)$, i=1, 2, ..., m will be described in which the one-to-one correspondence cannot be established between the loops on the upper and lower adjacent planes. (Note that the following numbers ①-⑦ correspond to the numbers ①-⑦ assigned in the figures.)

① First, the cross section data items L and U are labeled for each connected component. For example, assume that L and U are given as follows by use of appropriate 2D arrays IP[i, j] and JP[i, j].

$L = \{[i, j] | 1 \leq i \leq NI, 1 \leq j \leq NJ, IP[i, j] = 1\}$ $U = \{[i, j] | 1 \leq i \leq NI, 1 \leq j \leq NJ, JP[i, j] = 1\}$ Change the value of IP so that $L_i = \{[i, j] EL | IP[i, j] = i\}$ holds for $L = L_1 \cup L_2 \cup \ldots \cup L_p$, where $L_i$ represents a connected component of L (this is referred to as labeling).

The labeling is similarly performed also for the connected components of U: $U = U_1 \cup U_2 \cup \ldots \cup U_q$, where $U_j$ is a connected component of U.

② Next, the connected components of $L \cap U$ are labeled. The $L \cap U$ represents the overlapped portion or intersection as the 2D image data, namely, this is obtained by projecting the cross section data on the upper plane onto the cross section data on the lower plane or vice versa. As a result, the following relationship is obtained.

$L \cap U = W_1 \cup W_2 \cup \ldots \cup W_r$, where each $W_r$ is connected component of $L \cap U$ ③ If L has an inner boundary, label the connected components of $L' := (L \cap U) \cup$ (Inner boundary points of L).

$L' = S_1 \cup S_2 \cup \ldots \cup S_m$

Similarly, if U has an inner boundary, label the connected components of $U' := (L \cap U \cup)$ (Inner boundary points of U).

$U' = T_1 \cup T_2 \cup \ldots \cup T_n$

According to the present invention, the two adjacent planes are assumed to be located satisfactorily in the vicinity of each other, and the components of $U_j$ on the upper plane and $L_i$ on the lower plane which satisfy $U_j \cap L_i \neq \phi$ are corresponded to each other on this assumption, thereby producing a polyhedron. This assumption can be considered to be sufficient for practical uses.

Component partition of L and U will be accomplished in the following steps ④-⑤.

④ Obtain a subcomponent $\{C_i\}$ of L satisfying the following conditions.

(1) $L = \bigcup_{i=1}^{i_o} C_i$, where $C_i$ is connected $(1 \leq i \leq i_o)$ (2) $C_k \cap C_l = \phi$ for $k \neq l$ $(1 \leq k, 1 \leq i_o)$ (3) For an arbitrary $S_l (1 \leq l \leq m)$, there exists only one $C_{il}$ that includes the $S_l$.

⑤ Obtain a subcomponent $\{D_j\}$ of U satisfying the following conditions.

(1)' $U = \bigcup_{j=1}^{i_o} D_j$, where $D_j$ is connected $(1 \leq j \leq j_o)$ (2)' $D_k \cap D_l = \phi$ for $k=l$ $(1 \leq k, 1 \leq j_o)$ (3)' For an arbitrary $T_l (1 \leq l \leq n)$, there exists only one $D_{jl}$ that includes the $T_l$.

Figure 5:
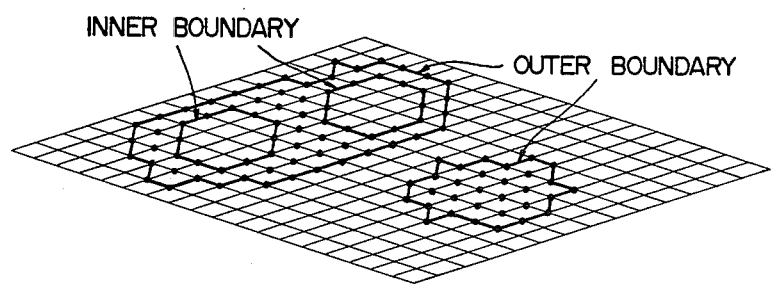
FIG. 5 is a schematic diagram illustrating boundary definitions.
Figure 6A:
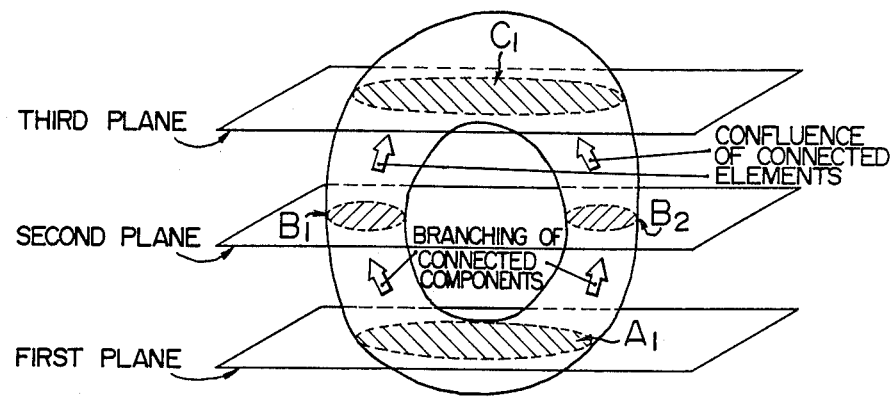
Figure 6B:
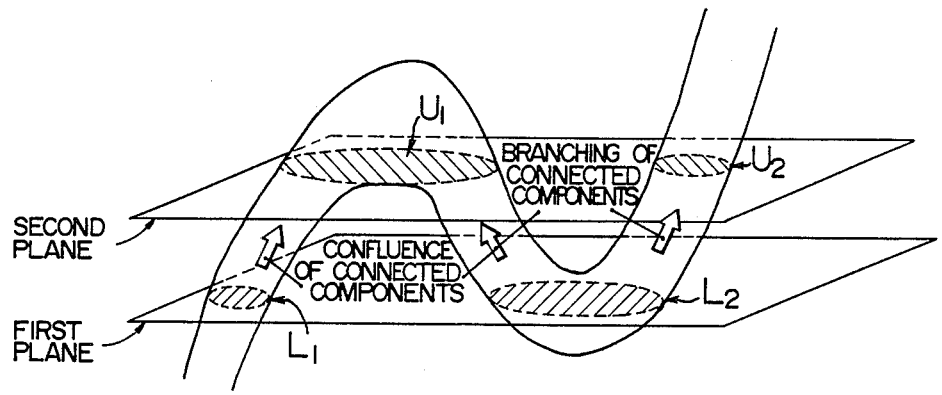

⑥ From $\{C_i\}$ and $\{D_j\}$ of steps ④ and ⑤, respectively, $C_{ik}$ and $C_{jk}$ each are determined, where the $C_{ik}$ and $C_{jk}$ includes component $W_k$ or $L \cap U$. Assume that number as a function of k, then $C(k):=i_k$ and $d(k)=jk$. In an ordinary case as shown in FIG. 11C-5, $d(k)=d(l)$ if $C(k)=C(l)$, and contrarily, $C(k)=C(l)$ if $d(k)=d(l)$. Consequently, when $\gamma_k:=$outer boundary of $C_{ik}$ and $\Gamma_k:=$outer boundary of $D_{jk}$ are determined, the one-to-one correspondence is established between the outer boundaries. That is, $\gamma_s = \gamma_t$ is identical to $\Gamma_s = \Gamma_t$. (Otherwise, an exception processing is necessary.) For example, in the case of FIG. 6C, the upper cross section data U is connected and includes a hole, while the lower cross section data L has two connected components each including a hole. When the processing of ①-⑤ is achieved, $U = D_1$ and $L = C_1 \cup C_2$ are obtained as shown in the diagrams. In this case, for example, $d(1)=d(3)$ $(=1)$ results, namely, although both $W_1$ and $W_3$ are included in $D_1$, $C(1)=1$ and $C(3)=2$ hold, this means that $W_1 \subset C_1$ and $W_3 \subset C_2$ result. As a consequence, the one-to-two correspondence is established between the outer boundary of $\Gamma_1 = D_1$ and that of $\gamma_i = C_i$ $(i=1, 2)$. In this case, assuming that $L''$ is a component also enclosed with $\gamma_1$ and $\gamma_2$ and that $U''$ is a component also enclosed with $\Gamma_1$, the processing of ②, ④, ⑤ is executed for $L=L''$ and $U=U''$ without considering the holes of $D_1$, $C_1$, and, $C_2$, thereby defining $\{C_i\}$ and $\{D_j\}$ again as $\{C_i'''\}$ and $\{D_j'''\}$ (FIG. 6D). Since no hole appears in the $L'''$ and $U'''$, the one-to-one corresponding is established between $\gamma_k$ and $\Gamma_k$ in this case. In the example of FIG. 6C, for example, $U''$ is partitioned into $D_1''$ and $D_2''$ having a boundary therebetween which vertically passes through almost the center of an inner component (hatched portion of FIG. 6D). In order to proceed to the processing ⑦, the pertinent exception processing is accomplished by assuming the following relationships.

$C_i = $(Outer boundary of $C_i''$)$\cup (C_i'' \cap L)$
$D_j = $(Outer boundary of $D_j''$)$\cup (D_j'' \cap U)$ These processing can be also easily incorporated as an algorithm.

⑦ For $C_{ik}$ having the outer boundary $\gamma k$ and $D_{jk}$ having the outer boundary $\Gamma_k$, assume $L^* =$ Component enclosed with an inner boundary of $C_{jk}$ and $U^* =$ Component enclosed with an inner boundary of $D_{jk}$.

Under conditions that $L=L^*$ and $U=U^*$ if $L^* \neq \phi$ and $U^* \neq \phi$, the operations ②, ④, ⑤, and ⑥ are executed. The operation③ is not required because neither $L^*$ nor $U^*$ has a hole.

If $L^* = \phi$ and $U^* = \phi$, an exception processing is assumed, namely, the points belonging to $C_{ik}$ are connected so as to conduct the triangulation on the surface of $C_{ik}$ (portion of the overall surfaces of the object). This is also the case for a condition of $L^* = \phi$ and $U^* \neq \phi$. If $L^* = \phi$ and $U^* = \phi$, no action is taken. The entire processing is automatically achieved by the computer system, and the essential problems accompanied by the triangulation are thus solved.

Figure 12:
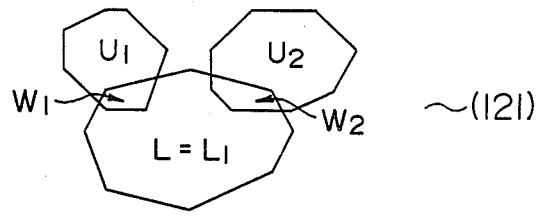
FIG. 12 is a diagram depicting an application example of the fundamental operation according to the present invention.
Figure 12:
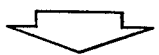
Figure 12:
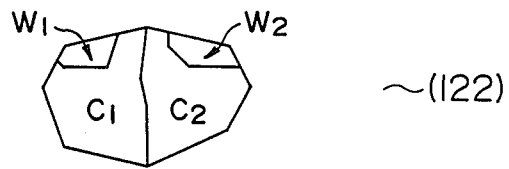
Figure 12:
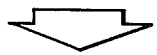
Figure 12:
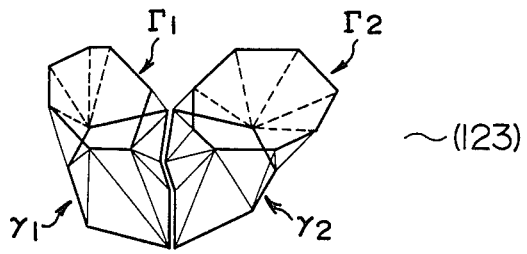

For example, in a case where branching occurs in the connected components from L to U (FIG. 6A), the problem is solved mainly by the processing ④, which will be described in connection to FIG. 12. When the processing ①-② is executed, the computer system recognizes that the lower cross section data is connected, that the upper cross section data U comprises two connected components $U_1$-$U_2$, and that $L \cap U$ includes two components $W_1$-$W_2$ (Frame 121 of FIG. 12). Since $L_1$ $(=L)$, $U_1$, and $U_2$ each are simply connected, the processing ③ is skipped and the processing ④ is performed. In this processing ④, $\{C_i\}$ satisfying the conditions (1)-(3) is obtained with respect to L (Frame 122 of FIG. 12). When the processing ⑤ is achieved, $U_1$ and $U_2$ are obtained as $\{D_j\}$ satisfying the conditions (1)'-(3)' with respect to U. If only the branching of connected components is to be considered, the processing ⑤ may be omitted. In the processing ⑥, assuming $\gamma_i =$outer boundary of $C_i$ $(i=1, 2)$ and $\Gamma_j =$outer boundary of $D_j$ $(j=1, 2)$, $\gamma_1$ and $\gamma_2$ are corresponded to $\Gamma_1$ and $\Gamma_2$, respectively, a polyhedron $\Delta_1$ is created from $\gamma_1$ and $\Gamma_1$, a polyhedron $\Delta_2$ is constructed from $\gamma_2$ and $\Gamma_2$, and $\Delta_1 \cup \Delta_2$ is calculated, thereby configuring an approximation model of the surface contour of the object between the two adjacent planes (Frame 123 of FIG. 12).

In the similar fashion, a case of confluence of connected components is solved mainly by the processing ⑤. Moreover, a case in which the branching and confluence of connected components occur at the same line (FIG. 6B) can also be processed by the effect of the processing ④-⑤.

In addition, the processing ③ and ⑦ enables the processing of a case in which cross section components include holes.

Figures 1, 11A:
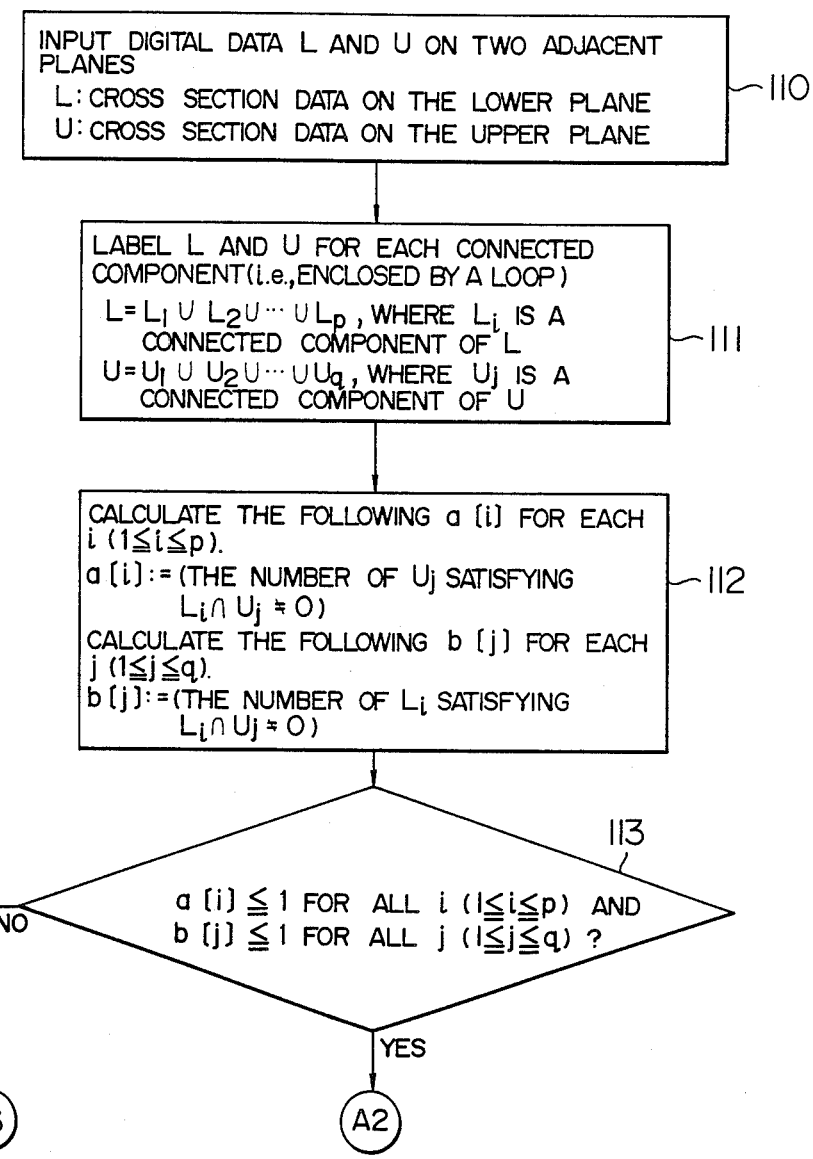

FIGS. 11A-1 to 11A-4 are flowcharts illustrating a processing flow of the fundamental operation in another embodiment of the present invention, while FIGS. 11B-1 to 11B-5 and FIGS. 11C-1 to 11C-6 are application diagrams associated with the processing of FIGS. 11A-1 to 11A-4. In these FIGS. exception processing stated above (e.g., FIG. 6C) are omitted.

The fundamental operation includes three processing sections of [I] Preprocessing, [II] Non-branching processing, and [III] Branch processing, which are to be executed after the cross section data L and U on the two adjacent planes are inputted. In the preprocessing, whether the processing [II] or [III] is to be achieved for the data of two cross sections is determined. The processing [II] is executed when the one-to-one correspondence exists between the connected components of L and U, whereas the processing [III] handles the other cases.

First, the processing [I] will be described. After L and U are inputted, the processing ① described above is accomplished, namely, the L and U are labeled for each connected component (step 111 of FIG. 11A-1). Assuming $$L = \bigcup_{i=1}^{p} L_i,$$

where $L_i$ is connected and $$U = \bigcup_{j=1}^{q} U_j,$$

where $U_j$ is connected, $a[i] = $ [Number of $U_j$ satisfying $L_i \cap U_j \neq \phi$]
is calculated for each i ($1 \leq i \leq p$); moreover, $b[j] = $ [Number of $L_i$ satisfying $L_i \cap U_j \neq \phi$]
is calculated for each j ($1 \leq j \leq q$) (step 112 of FIG. 11A-1). In general, $0 \leq a[i] \leq q$ and $0 \leq b[j] \leq p$ hold. Here, a[i] indicates the number of components $U_j$ on the upper plane which have an intersection with $L_i$ when projected on the lower plane, whereas b[j] denotes the number of components $L_i$ on the lower plane which have an intersection with $U_j$ when projected onto the upper plane. Ordinarily, the number of $U_j$ having an intersection with each $L_i$ is considered to be at most one, namely, the branching and confluence of connected components do not take place in most cases. Consequently, if the following conditions (*) are satisfied, the processing [II] is executed; otherwise, the processing [III] is achieved (step 113 of FIG. 11A-1).

Conditions (*) $\begin{cases} a[i] \leq 1 \text{ for all } i \, (1 \leq i \leq p) \\ b[j] \leq 1 \text{ for all } j \, (1 \leq j \leq q) \end{cases}$ For example, L and U each are connected (and hence $U_1 = U$ and $L_1 = L$) in FIG. 1B, and $a(1) = 1$ and $b(1) = 1$ are readily obtained, which satisfies the conditions (*). On the other hand, in FIG. 6B, although $L = L_1 \cup L_2$ and $U = U_1 \cup U_2$; $a(1) = 1$, $a(2) = 2$, $b(1) = 2$, and $b(2) = 1$ result, which does not satisfy the conditions (*).

Next, the processing [II] will be described. Since the conditions (*) are satisfied, for $L_i$ for which $a[i] = 1$ results, there exists only one component of U that has an intersection with $L_i$. Assuming the component to be $U_{ki}$, since $b[k_i] = 1$ from the conditions (*), only $L_i$ is the component of L that has an intersection with $U_{ki}$. In this case, therefore, it is only necessary to correspond the outer boundary of $L_i$ to that of $U_{ki}$, thereby constructing a polyhedron model comprising triangular faces. If $L_i$ and $U_{ki}$ has an inner boundary, the same processing as the processing ⑦ described before is executed. In this case, however, the following must be assumed.

$L^* = $ Component enclosed with an inner boundary of L included in $L_i$ $U^* = $ Component enclosed with an inner boundary of U included in $U_{ki}$ For $L_i$ for which $a[i] = 0$ results, on the other hand, the points of $L_i$ are interconnected to triangulate the face of $L_i$. The application example of the processing [II] is shown in FIGS. 11B-1 to 11B-5. In this example, the two adjacent cross sections each are of a shape of a doughnut slice. According to the preprocessing [I] (steps 110–113 of FIG. 11A-1), since L and U each are connected, the conditions (*) are satisfied. Executing then the step 114 of FIG. 11A-2, the outer boundaries $\gamma_1$ and $\Gamma_1$ of $L_1 (= L)$ and $U_1 (= U)$, respectively are first corresponded to each other (FIG. 11B-3). Assuming $L^*$ and $U^*$ to be holes or portions enclosed with the inner boundaries $\gamma^i$ and $\Gamma^i$ of $L_1$ and $U_1$, respectively, the step 116 of FIG. 11A-2 is accomplished so as to correspond the outer boundaries $\gamma_2$ and $\Gamma_2$ of $L^*$ and $U^*$, thereby effecting triangulation (FIG. 11B-4) to configure a polyhedron model (FIG. 11B-5).

As for the processing [III], which corresponds to the processing described in the step 117 and subsequent steps of FIG. 11A-3, namely, the processing ②–⑦ has already described.

According to the embodiment of the present invention, the configuration (fundamental operation) of a polyhedron model representing the surface contour of an object between two adjacent planes can be automatically processed by a computer system only by inputting data of the cross sections associated with the planes in which no restrictions are imposed with respect to topological conditions such as whether or not the cross section data is connected or has holes. The problems, for example, the branching and confluence of connected components (FIG. 6) and the processing of an object including holes (FIGS. 11B-1 to 11B-5 and FIGS. 11C-1 to 11C-6) have been solved by use of a conversational processing in the prior art technique; however, according to the present invention, these problems are solved by automatically determining a pair ($\gamma_k$, $\Gamma_k$) of loops satisfying the conditions 1–2.

As described at the beginning of the present Application, in order to construct a polyhedron model of a 3D object, the fundamental operation is repeatedly performed for each pair of adjacent two planes. Excepting the data input operation, the fundamental operation according to the present invention is carried out without necessitating indications to be supplied from an operator to the computer, which also enables the polyhedron model of the entire shape of an object to be automatically constructed. According to the present invention, the human load required for the polyhedron model construction regarded as the kernel of the technology for displaying an object based on 3D image data can be greatly reduced and moreover enables to supply a high-quality output.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for displaying a three-dimensional object on a display unit based on binary data representing cross sections along a plurality of parallel planes passing through the object wherein triangulation is effected between sequences of outer-most boundary points of overlapped components associated with a pair of data of adjacent planes selected from the parallel planes and the triangulation is sequentially effected on all pairs of data of adjacent planes to configure a three-dimensional model of the object, thereby displaying an approximated surface contour of the object, said method comprising the following steps of:

(a) for two adjacent planes, obtaining overlapped components on the respective planes by use of data on said two planes;

(b) projecting the overlapped components of a first plane of the adjacent planes onto a second plane thereof and labeling intersections between the projected components and the overlapped components on the second plane;

(c) obtaining extended components each containing one each of the intersections labeled on the second plane, said components having no intersection therebetween and a union of said components being consistent with an overlapped component including the intersections on the second plane;

(d) effecting triangulation by assuming as verteces sequences of outer-most boundary points of the components on the first plane and the extended components of the extended components having a same label on the second plane, respectively; and (e) sequentially effecting the triangulation on said plurality of parallel planes so as to approximate a surface contour of the three-dimensional object.

2. A method for displaying a three-dimensional object on a display unit based on binary data representing cross sections along a plurality of parallel planes passing through the object wherein triangulation is effected between sequences of outer-most boundary points of overlapped components associated with a pair of data of adjacent planes selected from the parallel planes and the triangulation is sequentially effected on all pairs of data of adjacent planes to configure a three-dimensional model of the object, thereby displaying an approximated surface contour of the object, said method comprising the following steps of:

(a) for two adjacent planes, obtaining overlapped components on the respective planes by use of data on said two planes;

(b) projecting the overlapped components of a first plane of the adjacent planes onto a second plane thereof and labeling intersections between the projected components and the overlapped components on the second plane;

(c) obtaining extended components each containing one each of the intersections labeled on the second plane, said components having no intersection therebetween and a union of said components being consistent with an overlapped component including the intersections on the second plane;

(d) projecting the overlapped components on the second plane onto the first plane and labeling intersections between the projected components and the overlapped components on the first plane;

(e) obtaining extended components each containing one each of the intersections labeled on the first plane, said components having no intersection therebetween and a union of said components being consistent with an overlapped component including the intersections in the first plane;

(f) effecting triangulation by assuming as verteces sequences of outer-most boundary points of the extended components on the first plane and the second plane, respectively, the first and second planes each including a same label; and (g) sequentially effecting the triangulation on said plurality of parallel planes so as to approximate a surface contour of the three-dimensional object.

3. A method according to claim 2 further comprising the steps of:

(a) determining the presence or absence of a hole for each said overlapped component on the adjacent planes based on the data associated therewith;

(b) projecting the overlapped components obtained from the first plane onto the second plane;

(c) projecting onto the data on the second plane as an overlapped component each determined to have a hole based on the data on the first plane, said overlapped components being summed with a sequence of inner boundary points, and labeling intersections between the projected component and the overlapped and summed components on the second plane;

(d) projecting onto the data on the first plane as an overlapped component each determined to have a hole based on the data on the second plane, said overlapped components being summed with a sequence of inner boundary points, and labeling intersections between the projected component and the overlapped and summed components on the first plane; and (e) effecting triangulation by assuming as verteces sequences of outer-most boundary points of the extended components on the first plane and the second plane, respectively, the first and second planes each including a same label; and if said extended components include sequences of inner boundary points, effecting the triangulation between the sequences of inner boundary points.

4. A three-dimensional digital image display method in a system including a computer accompanied by a file storing digital data of a three-dimensional object to be displayed and a graphic display unit displaying a result obtained by reconfiguring a shape of the object by the computer based on the data, in which a fundamental step includes an operation based on the data on two parallel adjacent planes in a display space for displaying a surface portion of the object between the two planes by use of triangle patches, and an entire surface of the object is reconfigured by triangle patches by repeating the fundamental step in the computer, wherein said fundamental step comprising the following steps of:

assuming one of the two planes as a first plane;

defining two arbitrary points in a component configured by the data on the first plane to belong to a same connected component only when the two points can be linked to each other with a line having nodal points in the component and one of two adjacent nodes of the line is in the vicinity of the other point thereof;

representing the component as a union of the connected components having no intersection therebetween, assuming the other plane of the two planes as a second plane, and representing a component configured by the data on the second plane as a union of connected components having no intersection therebetween;

projecting the connected components on the first plane onto each connected component on the second plane so as to obtain projected smaller components;

obtaining boundary point sequences of points in the connected components on the second plane, said sequences each including one each of the projected smaller components;

establishing a one-to-one correspondence between one of the boundary point sequences and a sequence of boundary points of the connected components on the first plane, the projected thereof result onto the connected components on the second plane being the projected smaller component enclosed with the boundary point sequence; and creating and displaying triangle faces by sequentially connecting each point of the boundary point sequence on the first plane and each point of the boundary point sequence on the second plane.

5. A method according to claim 4 comprising the following steps of for each said projected smaller component projected onto the connected components configured with the data on the second plane, obtaining subcomponents of the connected components each including one each of the projected smaller components and having no intersection therebetween, a union of said subcomponents being consistent with the connected components;

establishing a one-to-one correspondence between a sequence of boundary points of the subcomponents and a sequence of boundary points including boundary points of the connected components and enclosing the connected components, the projected result thereof onto the connected components being the proected smaller component enclosed with the boundary point sequence; and generating triangle faces by sequentially connecting the points of the boundary sequences on the first and second planes, respectively.

6. A method according to claim 4 further including the steps of:

for each projected smaller component projected onto the connected components configured with the data on the second plane, defining an extended projected smaller component as the projected smaller component;

defining as points of the extended projected smaller component points selected from the vicinity of each boundary point of the extended porjected smaller component, said selected points of the connected components not belonging to any extended projected smaller component;

growing the extended projected smaller component by repeating the foregoing operation until a union of the extended projected smaller component becomes consistent with the total of the connected components;

for each extended projected smaller component, obtaining a sequence of boundary points including boundary points of the extended projected smaller component and enclosing the extended projected smaller component;

establishing a one-to-one correspondence between one of the boundary point sequences and a sequence of boundary points including boundary points of the connected components on the first plane and including the connected components, the projected result thereof onto the connected components being the projected smaller component enclosed with the boundary point sequence; and producing triangle faces by sequentially connecting the boundary point sequences of the first and second planes, respectively.

7. A method according to claim 4 further comprising the following steps of:

obtaining sequences of boundary points in the connected components on the second plane, said components including one each of the projected smaller components on the second plane;

for one of the boundary point sequences, establishing a one-to-one correspondence between the boundary point sequence and a sequence of boundary points including nodes of an outermost loop selected from the loops; and generating triangle faces by sequentially connecting the boundary point sequences on the first and second planes respectively.

8. A method according to claim 4 further comprising the following steps of:

obtaining subcomponents of said connected components including one each of the projected smaller components projected onto the connected components configured with the data on the second plane and having no interface therebetween, a union thereof being consistent with the connected components;

establishing a one-to-one correspondence between a sequence of boundary points including nodes of an outermost loop of the loops and a sequence of boundary points of the connected components on the first plain, the projected result thereof onto the connected components being the projected smaller component enclosed with the boundary point sequence; and generating triangle faces by connecting the points of the boundary point sequences of the first and second planes, respectively.

9. A three-dimensional object polyhedron model display method in a system in which a polyhedron model of a three-dimensional object is configured by a computer based on a two-dimensional digital image data supplied thereto, said data associated with a plurality of parallel cross sections of the object for displaying by the polyhedron model a surface contour of the object between two adjacent cross sections selected from the cross sections, said method comprising the following steps of;

determining one of the two adjacent cross sections associated with the digital image data and the other thereof as a first cross section and a second cross section, respectively;

representing the two cross sections by unions of connected components, respectively;

for each of the connected components of said representing step, obtaining all outer boundary point sequences enclosing the connected component and all inner boundary point sequences enclosing holes in the connected component;

determining as a third cross section common portions between the first and second cross sections;

obtaining subsets of connected components of the first cross section having no common portion therebetween, one of the subsets including an arbitrary connected component of a union of the third cross section and all inner boundary point sequences of the first cross sections and the whole first cross section being consistent with a union of the subsets;

treating each said subset as a portion component of the first cross section with respect to the third cross section;

obtaining subsets of connected components of the second cross section having no common portion therebetween, one of the subsets including an arbitrary connected component of a union of the third cross section and all inner boundary point sequences of the second cross section and the whole second cross section being consistent with a union of the subsets;

treating each of said subset as a partition component of the second cross section with respect to the third cross section;

obtaining all connected components of the third cross section;

for each said connected component, configuring faces of a polyhedron from an outer boundary point sequence of the partition component of the first cross section including the connected component and from an outer boundary point sequence of the partition component of the second cross section including the connected component;

determining as a new first cross section a component of which an outer boundary point sequence comprises an inner boundary point sequence of the first cross section in the partition component thereof;

determining as a new second cross section a component of which an outer boundary point sequence comprises an inner boundary point sequence of the second cross section in the partition component thereof;

determining as a new third cross section an intersection of the new first cross section and the new second cross section;

obtaining a partition component of the new first cross section with respect to the new third cross section and a partition component of the new second cross section with respect to the new third cross section;

determining partition components of the new first and second cross sections, said components including the connected components consistent with the connected components of the new third cross section; and configuring faces of a polyhedron based on the outer boundary point sequence of the partition component of the new first cross section and the outer boundary point sequence of the partition component of the new second cross section, thereby displaying the object based on the polyhedron model.

10. A method according to claim 9 further including the following steps of:

for obtaining a partition component of the first cross section with respect to the third cross section for each connected component of a set including the third cross section and all inner boundary points of the first cross section, determining the connected components as the partition component;

determining, among eight points in the vicinity of each boundary point of the partition component, points of the first cross section not included in any one of the other partition components as points of the partition component;

sequentially growing the partition component by repeatedly achieving the foregoing operation for all partition components until a union of the partition components becomes consistent with the first cross section;

determining each said partition component as a partition component of the first cross section with respect to the third cross section;

for obtaining a partition component of the second cross section with respect to the third cross section for each connected component of a set comprising the third cross section and all inner boundary points of the second cross section, determining the connected components as the partition component;

determining, among four or eight points in the vicinity of each boundary point of the partition boundary, points of the second cross section not included in any one of the other partition components as points of the partition component;

sequentially growing the partition component by repeatedly achieving the foregoing operation for all partition components until a union of the partition components becomes consistent with the second cross section;

treating each said partition component as a partition component of the second cross section with respect to the third cross section;

for obtaining a partition component of the new first cross section with respect to the third cross section, treating, for each connected component of the new third cross section, the connected component as the partition component;

determining, among eight points in the vicinity of each boundary point of the partition boundary, points of the new first cross section not included in any other partition components as points of the partition component;

sequentially growing the partition component by repeatedly achieving the foregoing operation for all partition components until a union of the partition components becomes consistent with the new first cross section;

treating each said partition component as a partition component of the new first cross section with respect to the new third cross section;

for obtaining a partition component of the new second cross section with respect to the new third cross section, treating, for each said connected component of the new third cross section, the connected component as a partition component;

determining, among eight points in the vicinity of each boundary point of the partition component, points of the new second cross section not included in any other partition components as points of the partition component;

sequentially growing the partition component by repeatedly achieving the foregoing operation for all partition components until a union of the partition components becomes consistent with the new second cross section; and treating each said partition component as a partition component of the new second cross section with respect to the new third cross section.

* * * * *